United States Patent
Koike et al.

(10) Patent No.: US 12,526,532 B2
(45) Date of Patent: Jan. 13, 2026

(54) IMAGING APPARATUS, IMAGING CONTROL METHOD, AND PROGRAM

(71) Applicant: Sony Group Corporation, Tokyo (JP)

(72) Inventors: Yoshiaki Koike, Kanagawa (JP); Satoko Suzuki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 272 days.

(21) Appl. No.: 18/260,365

(22) PCT Filed: Nov. 25, 2021

(86) PCT No.: PCT/JP2021/043165
§ 371 (c)(1),
(2) Date: Jul. 5, 2023

(87) PCT Pub. No.: WO2022/153682
PCT Pub. Date: Jul. 21, 2022

(65) Prior Publication Data
US 2024/0031686 A1    Jan. 25, 2024

(30) Foreign Application Priority Data

Jan. 12, 2021 (JP) ................. 2021-002695

(51) Int. Cl.
| | |
|---|---|
| *H04N 23/745* | (2023.01) |
| *H04N 23/60* | (2023.01) |
| *H04N 23/63* | (2023.01) |
| *H04N 23/81* | (2023.01) |
| *H04N 25/62* | (2023.01) |
| *H04N 25/76* | (2023.01) |

(52) U.S. Cl.
CPC ........... *H04N 23/745* (2023.01); *H04N 23/63* (2023.01); *H04N 23/665* (2023.01); *H04N 23/81* (2023.01); *H04N 25/62* (2023.01); *H04N 25/7795* (2023.01)

(58) Field of Classification Search
CPC .... H04N 23/745; H04N 23/63; H04N 23/665; H04N 23/81; H04N 25/62; H04N 25/7795; H04N 23/667; H04N 23/80; H04N 25/531
USPC ...................................................... 348/228.1
See application file for complete search history.

(56) References Cited

U.S. PATENT DOCUMENTS

| | | | |
|---|---|---|---|
| 9,871,975 B2 * | 1/2018 | Nakagawara | ........ H04N 23/745 |
| 2006/0152598 A1 * | 7/2006 | Kawarada | .......... H04N 23/745 |
| | | | 348/E5.037 |

(Continued)

FOREIGN PATENT DOCUMENTS

EP    3474537 A1    4/2019

*Primary Examiner* — Lin Ye
*Assistant Examiner* — Chan T Nguyen
(74) *Attorney, Agent, or Firm* — Michael Best & Friedrich LLP

(57) ABSTRACT

An imaging apparatus includes a control unit configured to perform a margin-based flickerless control. The margin-based flickerless control is a control where a timing control is performed, on the basis of a period of a detected flicker component and a peak timing of the flicker component, to synchronize a specific timing within an exposure duration with the peak timing and where the timing control is not performed as long as an offset amount of the specific timing falls within a margin set as an offset allowance from the peak timing.

19 Claims, 12 Drawing Sheets

(56) References Cited

U.S. PATENT DOCUMENTS

2016/0006919 A1* 1/2016 Aoyama ................ H04N 23/73
                                                        348/226.1
2016/0344965 A1* 11/2016 Grauer ................ H10F 39/1865
2019/0215434 A1*  7/2019 Suzuki ................... H04N 23/72

* cited by examiner

IMAGING APPARATUS, IMAGING CONTROL METHOD, AND PROGRAM

TECHNICAL FIELD

The pre-sent technology relates to an imaging apparatus, an imaging control method, and a program, particularly, to a technology for capturing an image with a reduced influence of a flicker.

BACKGROUND ART

An image captured by an imaging apparatus (a camera) may be influenced by a flicker. For example, regarding a fluorescent lamp which has been widely used as an indoor light source, an LED (Light Emitting Diode) which has recently been increasingly widely used, or the like, flashing of illumination light, what is called flicker, periodically occurs due to an influence of a commercial power source frequency. In a captured image, a decrease in image quality, such as color unevenness, due to such a flicker occurs.

PTL 1 below discloses a technology for performing what is called flickerless imaging, where an influence of a flicker is reduced by detecting a period and a timing of a peak of a flicker component and performing a control to synchronize a timing of exposure with the peak timing.

Meanwhile, many of users (a user herein mainly refers to a person who uses a camera to capture an image) determine a shooting timing by checking an image, namely, a live view image, displayed on a display unit such as a display panel or an EVF (electric viewfinder) disposed in a back surface of a camera, and operate a release button (a shutter button). At the time of the release operation, no live view image can be displayed by reason of switching of an exposure action or the like, resulting in a blackout of the display unit.

PTL 2 discloses a technology for avoiding a blackout.

CITATION LIST

Patent Literature

[PTL 1]
    WO2017/217137
[PTL 2]
    WO2018/179711

SUMMARY

Technical Problem

In this regard, in a case where flickerless imaging is performed in, for example, a continuous shooting mode, in which an image is to be captured with a live view image displayed, to cause an exposure timing to match a peak timing of a flicker, it is difficult to constantly update the live view image at a regular interval.

Specifically, the same live view image may continuously appear for multiple times depending on a timing of imaging, causing a change of a frame rate for a user to see or a change of a duration length (latency) from exposure to the display of a live view image.

Such a variation in frame rate for a user to see or a variation in latency results in a failure of a smooth live view image to be displayed, which may make it difficult for a user to perform framing while looking at the live view image.

Accordingly, the present technology provides a technology that achieves capturing an image less influenced by a flicker and enables reducing a situation where a live view image fails to be smooth.

Solution to Problem

An imaging apparatus according to the present technology includes a control unit configured to perform a margin-based flickerless control where a timing control is performed, on the basis of a period of a detected flicker component and a peak timing of the flicker component, to synchronize a specific timing within an exposure duration with the peak timing, and where the timing control is not performed as long as an offset amount between the specific timing and the peak timing falls within a set margin.

In a case where, as what is called flickerless imaging, the specific timing within the exposure duration is to be synchronized with the peak timing of the flicker component, a control for the synchronization is not performed as long as an offset of the specific timing is within the margin.

It should be noted that an imaging control apparatus including such a control unit is assumable.

In the imaging apparatus according to the present technology described above, it is possible that the control unit is configured to perform the margin-based flickerless control in a case where continuous imaging is performed while a live view image is being displayed.

In a case where continuous imaging is performed while the live view image is being displayed, flickerless imaging is performed, and, at that time, it is determined whether or not the timing control is to be performed according to whether or not an offset of the timing falls within the margin.

In the imaging apparatus according to the present technology described above, it is possible that, in a case where a capture exposure for generating both a single still image constituting continuously shot images and the live view image and one or multiple coma-to-coma exposures for generating the live view image are repeated during the continuous imaging, the control unit is configured to perform the timing control for a first capture exposure after start of the continuous imaging, and, for second and subsequent capture exposures, the control unit is configured not to perform the timing control as long as the offset amount of the specific timing falls within the margin but is configured to perform the timing control unless the offset amount of the specific timing falls within the margin.

For the first one of the continuously shot images, the timing control is performed to achieve the flickerless imaging. In the capture exposures for the second and subsequent images, the margin-based flickerless control is performed.

In the imaging apparatus according to the present technology described above, it is possible that a duration length from a start timing of a previous exposure duration to a start timing of a current exposure duration and a duration length from a start timing of an exposure duration before the previous exposure duration to the start timing of the previous exposure duration are the same, and the control unit is configured to determine whether or not the offset amount of the specific timing in the current exposure duration from the peak timing falls within the margin.

This means that it is determined whether or not the timing control is to be performed according to how much the specific timing in the exposure duration is offset from the peak timing with the exposure period kept.

In the imaging apparatus according to the present technology described above, it is possible that the specific timing is a timing of an exposure centroid.

For example, the timing of the exposure centroid is a timing corresponding to substantially the middle of an exposure duration of substantially a middle line in a vertical direction of an imaging element.

In the imaging apparatus according to the present technology described above, it is possible that the margin is set in accordance with a curtain speed.

This is because a range of the timing offset amount in which a flicker is less influenceable broadens as the curtain speed increases.

In the imaging apparatus according to the present technology described above, it is possible that the margin is set according to an exposure shortfall from a peak level of the flicker component.

This is because a range of the timing offset amount in which a flicker is less influenceable is different depending on the exposure shortfall.

In the imaging apparatus according to the present technology described above, it is possible that a different value is set as the margin according to whether or not flicker correction is to be performed on the basis of the period of the detected flicker component and the peak timing of the flicker component.

This is because, in a case where the flicker correction that reduces an influence of a flicker, a range where the influence of the flicker in an image is not outstanding is widened.

In the imaging apparatus according to the present technology described above, it is possible that the margin is set according to the number of pixels read from an imaging element.

When the number of read pixels is different, the curtain speed also changes. Accordingly, the margin is set according to the number of read pixels.

In addition, it is possible that the margin is set according to whether or not exposure is for an image to record. This is because a degree of allowance against an influence of a flicker is different.

In addition, it is possible that, in a case where the exposure is for the image to record, the margin is set narrower than that during a duration when the exposure for the image to record is not performed.

An imaging control method according to the present technology is an imaging control method in which the imaging control apparatus performs a margin-based flickerless control where a timing control is performed, on the basis of a period of a detected flicker component and a peak timing of the flicker component, to synchronize a specific timing within an exposure duration with the peak timing and where the timing control is not performed as long as an offset amount of the specific timing falls within a margin set as an offset allowance from the peak timing.

This prevents, from occurring, a case where the timing control as the flickerless imaging is performed and a case where it is not performed.

A program according to the present technology is a program configured to cause an arithmetic processing apparatus to perform the above margin-based flickerless control.

This makes it possible to easily implement the imaging control apparatus and the imaging apparatus of the present disclosure.

DESCRIPTION OF EMBODIMENT

An embodiment will be described below in the following order.

<1. Configuration of Imaging Apparatus>
<2. Flickerless Imaging and Flicker Correction>
<3. Margin-Based Flickerless Control>
<4. Setting Example of Margin>
<5. Summary and Modification Examples>

Incidentally, the meanings of some of terms used herein will be explained.

The terms "capture exposure" refers to an exposure action for recording an image, which is to be performed in response to a user (a photographer) operating a release button (a shutter button) of an imaging apparatus.

The term "capture image" is an image based on an image signal obtained by capture exposure. The capture image is to be recorded in a form of a still image, multiple still images as continuously captured, or one frame of a moving image, or the like in a recording medium.

The term "coma-to-coma exposure" is exposure that is to be performed during a duration between a capture exposure and a subsequent capture exposure during continuous imaging, particularly, an exposure for generating a live view image. Thus, it is allowed to read a smaller number of pixels from an imaging element (an exposure for a low-resolution image) than the capture exposure.

The term "live view image" or "LV image" refers to an image captured by the imaging element and displayed in a state where a user can see the image on a display unit. That is, it is an image illustrating an object-side view on a real-time basis.

For example, at the time before a release operation for a still image, a low-resolution image is to be captured as by coma-to-coma exposure, and image data regarding each frame of a live view image is to be generated.

A live view image for continuous imaging is to be generated from both the capture exposure and the coma-to-coma exposure.

It should be noted that a capture image is usually generated and recorded as a high-resolution image with a large number of pixels, reflecting the number of pixels of the imaging element, whereas a live view image is to be generated and displayed as a low-resolution image corresponding to the displayable number of pixels for the display unit.

<1. Configuration of Imaging Apparatus>

Figure 1:
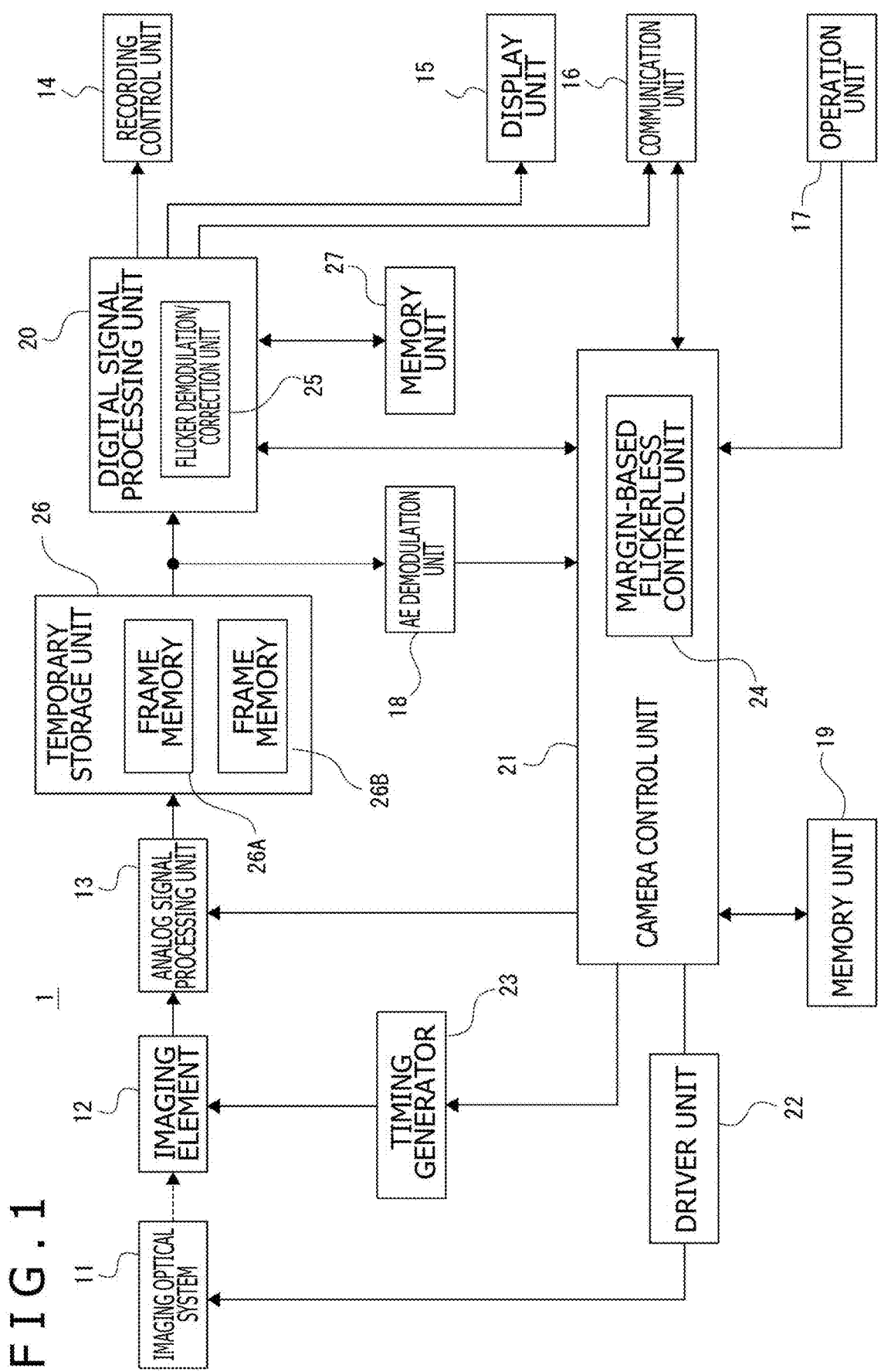
FIG. 1 is a block diagram of an imaging apparatus of an embodiment of the present technology.

FIG. 1 illustrates a configuration example of an imaging apparatus 1 of an embodiment.

In the imaging apparatus 1, light from an object enters an imaging element 12, which includes, for example, a CMOS (Complementary Metal Oxide Semiconductor) sensor or a CCD (Charge Coupled Device) sensor, via an imaging optical system 11 to be photoelectrically converted through the imaging element 12, and an analog image signal is obtained from the imaging element 12.

The imaging optical system 11 includes a variety of lenses such as a zoom lens, a focus lens, and a condenser lens, an aperture mechanism, a drive mechanism for the zoom lens, and a drive mechanism for the focus lens. The imaging optical system 11 includes a mechanical shutter (for example, a focal plane shutter) in some cases.

The imaging element 12 is an element including, for example, on a CMOS substrate, multiple pixels formed in a two-dimensional arrangement, a vertical scanning circuit, a horizontal scanning circuit, and an image signal output circuit, the pixels each including a photodiode (photogate), a transfer gate (shutter transistor), a switching transistor (address transistor), an amplifier transistor, a reset transistor (reset gate), and the like.

The imaging element 12 may be either a primary-color-based or a complementary-color-based element, and an analog image signal to be obtained from the imaging element 12 is a primary-color signal of each of RGB colors or a complementary-color-based color signal. In addition, the imaging element 12 may include no color filter so that the analog image signal is obtained from the imaging element 12 to be a monochrome image signal.

The analog image signal from the imaging element 12 is sampled and held on a color-signal basis by an analog signal processing unit 13 in a form of an IC (Integrated circuit), is amplitude-adjusted by AGC (Automatic Gain Control), and is converted to a digital image signal by A/D (Analog to Digital) conversion.

The digital image signal (hereinafter, image data) from the analog signal processing unit 13 is inputted to a temporary storage unit 26.

It should be noted that the imaging element 12 and the analog signal processing unit 13 or the temporary storage unit 26 in addition thereto are integrated in some cases. In addition, a frame memory, which will be described next as the temporary storage unit 26, may be located within a stacked imaging element.

The temporary storage unit 26 includes two frame memories 26A and 26B in this example.

The image data from the analog signal processing unit 13 is stored alternately in the frame memory 26A and the frame memory 26B. That is, the temporary storage unit 26 stores two continuously captured image frames. The frames of the image data stored in the temporary storage unit 26 are sequentially outputted to a digital signal processing unit 20 on a first-in-first-out basis. That is, the data is sequentially outputted to the digital signal processing unit 20 alternately from the frame memory 26A and frame memory 26B in order of imaging.

By virtue of including the frame memories 26A and 26B, a live view image can be continuously displayed without a blackout even during, for example, continuous imaging.

The digital signal processing unit 20 is configured as an image processing processor in a form of, for example, a DSP (Digital Signal Processor) or the like. The digital signal processing unit 20 applies various types of signal processing to the inputted image data. For example, the digital signal processing unit 20 performs, as camera processes, a preparation process, a synchronization process, a YC generation process, and the like.

In addition, in the digital signal processing unit 20, the image data subjected to these various processes is subjected to file formation processing, for example, compression/coding for recording or for communication, formatting, generation/addition of metadata, and the like, to generate a file for recording or for communication. For example, an image file in a form of JPEG, TIFF (Tagged Image File Format), GIF (Graphics Interchange Format), or the like is generated as a still image file. In addition, an image file may be generated in an MP4 format, which is used for recording MPEG-4-compliant moving image/voice, or the like.

It should be noted that an image file may be generated as RAW image data.

In addition, the digital signal processing unit 20 applies resolution conversion processing to the image data subjected to the various types of signal processing to generate image data whose resolution has been reduced for, for example, live view display.

In addition, the digital signal processing unit 20 includes a flicker demodulation/correction unit 25.

The flicker demodulation/correction unit 25 performs a process to detect a period and a peak timing of a flicker and pass information regarding the period and the peak timing to a camera control unit 21 so that flickerless imaging can be performed.

The flicker demodulation/correction unit 25 also applies a correction process for reducing a flicker to the image data in some cases.

A memory unit 27 refers to a buffer memory for image data.

The image data processed by the digital signal processing unit 20 is temporarily stored in the memory unit 27 and is transferred to a display unit 15 and a recording control unit 14 or to a communication unit 16 at a predetermined timing.

The recording control unit 14 performs recording and reproduction with respect to a recording medium in a form of, for example, a non-volatile memory. The recording control unit 14 performs, for example, a process to record an image file such as moving image data or still image data in a recording medium.

The recording control unit 14 can actually take a variety of forms. For example, the recording control unit 14 may be configured as a flash memory installed in the imaging apparatus 1 and a writing/reading circuit therefor. Alternatively, the recording control unit 14 may be in a form of a card recording/reproduction unit that performs, for example, recording/reproduction access with respect to a recording medium removably attached to the imaging apparatus 1, such as a memory card (portable flash memory or the like). Alternatively, the recording control unit 14 is implemented in a form installed in the imaging apparatus 1, such as an HDD (Hard Disk Drive), in some cases.

The display unit 15, that is, a display unit that performs various types of display with respect to a photographer, is in a form of, for example, a display panel or a viewfinder, such as a liquid crystal panel (LCD: Liquid Crystal Display) or an organic EL (Electro-Luminescence) display, located in a housing of the imaging apparatus 1.

The display unit 15 performs the various types of display on a display screen on the basis of instructions from the camera control unit 21.

For example, the display unit 15 causes a reproduced image of image data read from the recording medium by the recording control unit 14 to be displayed.

In addition, the display unit 15 receives image data regarding a captured image subjected to resolution-conversion for display by the digital signal processing unit 20 and performs display, accordingly, for example, the display of a live view image.

In addition, the display unit 15 causes a menu of various operations, an icon, a message, and the like, namely, a GUI (Graphical User Interface), to be displayed on the screen on the basis of the instructions from the camera control unit 21.

The communication unit 16 performs data communication or network communication with external equipment by wiredly or wirelessly. For example, the communication unit 16 sends and outputs image data (a still image file or a moving image file) or metadata to an external information processing apparatus, a display apparatus, a recording apparatus, a reproduction apparatus, or the like.

In addition, the communication unit 16 is capable of performing, as a network communication unit, for example, various types of network communication over the Internet, a home network, a LAN (Local Area Network), and the like to send and receive various types of data to and from a server, a terminal, and the like on the networks.

An operation unit 17 collectively refers to input devices for a user to various input operations. Specifically, the operation unit 17 refers to various operating parts (a key, a dial, a touch panel, a touch pad, and the like) located on the housing of the imaging apparatus 1.

The operation unit 17 senses a user operation and sends a signal corresponding to the inputted operation to the camera control unit 21.

An AE (Automatic Exposure) demodulation unit 18 performs a demodulation process for an automatic exposure adjustment from a digital image signal and supplies brightness information to the camera control unit 21.

The camera control unit 21 includes a microcomputer (arithmetic processing apparatus) including a CPU (Central Processing Unit).

A memory unit 19 stores information to be used by the camera control unit 21 and the like. The memory unit 19 illustrated in the drawing collectively refers to, for example, a ROM (Read Only Memory), a RAM (Random Access Memory), a flash memory, and the like.

The memory unit 19 may be a memory region installed in a microcomputer chip serving as the camera control unit 21 or may include a separate memory chip.

The camera control unit 21 controls the whole of the imaging apparatus 1 by executing a program stored in the ROM, the flash memory, or the like of the memory unit 19.

For example, the camera control unit 21 issues instructions on the various types of signal processing in the digital signal processing unit 20 and controls an imaging action or a recording action according to a user operation, a reproduction action for a recorded image file, and the like.

The camera control unit 21 also performs, as automatic exposure controls based on a demodulation signal from the AE demodulation unit 18, an action control of the aperture mechanism, a control of a shutter speed of the imaging element 12, and an AGC gain control in the analog signal processing unit 13.

The camera control unit 21 also performs an autofocus control and drive controls of a focus lens and a zoom lens according to a manual focus operation, a zoom operation, and the like.

The camera control unit 21 is also equipped with a function as a margin-based flickerless control unit 24, which is provided by, for example, software. Accordingly, the camera control unit 21 corresponds to an imaging control apparatus that performs a margin-based flickerless control.

The margin-based flickerless control unit 24 performs a timing control to synchronize a specific timing (for example, a timing of an exposure centroid) within an exposure duration with a peak timing on the basis of a period of a detected flicker component and a peak timing of the flicker component. That is, it performs control to cause the flickerless imaging to be performed. It should be noted that the exposure duration refers to an effective duration of exposure using a mechanical shutter or an electronic shutter.

Incidentally, as long as an offset amount of the specific timing falls within a margin set as an offset allowance from the peak timing, the above-described timing control for the flickerless imaging is not performed. The margin is set as a range allowing an flickerless imaging effect to be maintained to some extent without the necessity of shifting the exposure duration.

It should be noted that the flickerless imaging, a detail of which will be described later, is an imaging action capable of reducing an influence on an image quality (a decrease in image quality) due to a flicker generated from a flicker light source.

The RAM in the memory unit 19 is used to temporarily store data, programs, and the like as a work region for various types of data processing of the CPU of the camera control unit 21.

The ROM and the flash memory (non-volatile memory) in the memory unit 19 are used to store an OS (Operating System) for the CPU to control each unit, an application program for various operations, firmware, various types of setting information, and the like.

Examples of the various types of setting information include communication setting information, setting information regarding an imaging action, setting information regarding image processing, and the like. Examples of the setting information regarding an imaging action include exposure setting, shutter speed setting, curtain speed setting of the mechanical shutter or the electronic shutter, mode setting, and setting of the above-described margin.

A driver unit 22 includes, for example, a motor driver for a zoom lens drive motor, a motor driver for a focus lens driver motor, a motor driver for the aperture mechanism, and the like.

These motor drivers apply drive currents to the respective drivers in response to the instructions from the camera control unit 21, causing movements of the focus lens and the zoom lens, opening/closing of an aperture blade of the aperture mechanism, and the like to be performed.

The shutter speed, exposure timing, and the like of the imaging element 12 are determined in accordance with a timing signal of a timing generator 23.

The timing generator 23 outputs various timing signals to the imaging element 12 on the basis of a timing control signal from the camera control unit 21. This causes the imaging element 12 to be driven on the basis of a control by the camera control unit 21.

Here, description will be made on a flow of data processing for displaying a live view image during standby for still image recording, or the like and a flow of data processing for recording a capture image with reference to FIG. 2A and FIG. 2B.

In the drawings, arrows LV indicate a flow of live view image data, and arrows CAP indicate a flow of capture image data.

Figure 2:
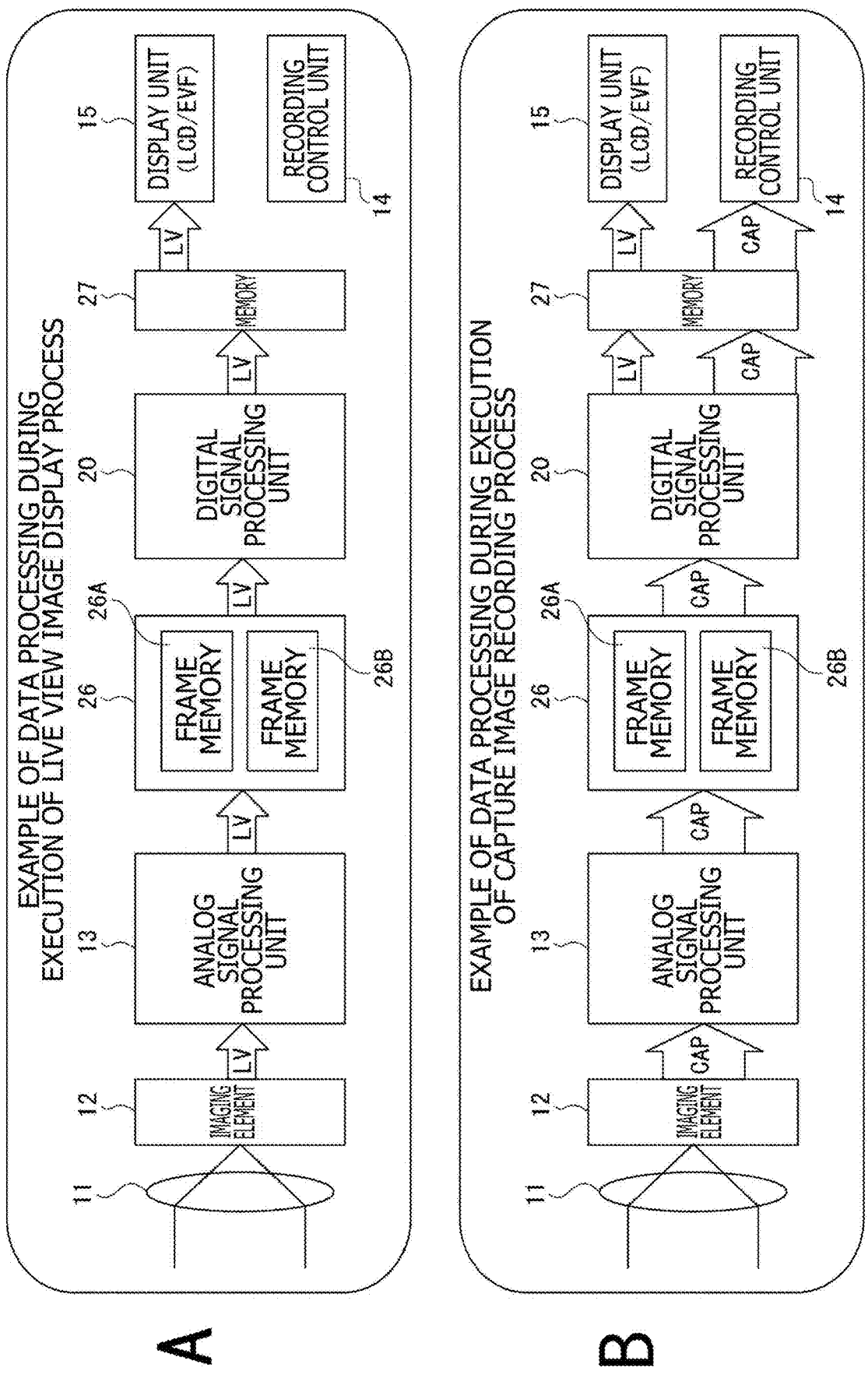
FIG. 2 is an illustration of flows of processing during standby for recording and during capture.

First, FIG. 2A is a flow of processing for displaying a live view image during standby for the release operation or a start operation for recording a moving image.

Light entering through the imaging optical system 11 enters the imaging element 12, and the imaging element 12 outputs a photoelectrically converted image signal.

It should be noted that the image signal in this case is an image signal with a relatively low resolution for live view display. For example, in outputting an image signal for live view display, the imaging element 12 outputs a pixel signal with a small number of pixels, from which some pixels are removed, instead of outputting all the pixels.

In contrast, in outputting an image signal for recording by capture exposure, a pixel signal with almost all the pixels of the imaging element 12 is outputted due to the necessity of generating an image for recording with a large number of pixels.

In FIG. 2A, the image signal from the imaging element 12 is processed by the analog signal processing unit 13, being supplied as a digital signal to the temporary storage unit 26. The digitized image data is stored alternately in the frame memories 26A and 26B on a frame-by-frame basis as described above. Then, the frames of the image data stored in the temporary storage unit 26 are sequentially outputted to the digital signal processing unit 20 on a first-in-first-out basis. The digital signal processing unit 20 performs a necessary process to generate image data for live view display and stores it in the memory unit 27. The display unit 15 displays an LV image stored in the memory unit 27.

FIG. 2B illustrates the flow of data processing for recording a capture image. For example, in response to a user performing the release operation, the processing in FIG. 2B is performed.

In response to the user performing the release operation, light entering through the imaging optical system 11 enters the imaging element 12, and an exposure process is started. Incidentally, there is a certain time interval after the release operation until the exposure process of the imaging element 12 is started, namely, a release lag (release time lag). For example, it is time as long as 15 msec to 30 msec, approximately.

When the exposure process by the imaging element 12 is terminated, the imaging element 12 outputs a photoelectrically converted image signal to the analog signal processing unit 13. In this case, the image signal is a high-resolution image signal for, for example, still image recording.

It should be noted that the arrows LV are drawn thin and the arrows CAP are drawn thick in FIG. 2A and FIG. 2B, and the numbers of pixels of image signals are expressed by the thicknesses of the arrows.

The image data converted to a digital signal by the analog signal processing unit 13 is processed by the digital signal processing unit 20 via the temporary storage unit 26. In this case, the digital signal processing unit 20 not only generates high-resolution image data for recording but also generates low-resolution image data for live view display, and stores the image data for recording and the image data for live view display in the memory unit 27 together. Then, the image data for recording is transferred to the recording control unit 14 to be subjected to a recording process, and the image data for live view display is transferred to the display unit 15 to be used for live view display.

As described above, live view display is performed in a state before the release operation for still image recording and during the release operation, but a phenomenon (blackout) of the display of a live view image getting interrupted at a timing after release may occur.

Description will be made on a process for preventing the live view image from being interrupted by a blackout.

In response to the release operation being performed during an exposure for the live view image, the camera control unit 21 instructs the imaging element 12 to suspend the exposure for the live view image and change a mode. For example, the camera control unit 21 instructs the imaging element 12 to change pixels to read, resolution, and the like in order to perform capture exposure. Then, after preparations for capture exposure are made, the camera control unit 21 causes the imaging element 12 to start the capture exposure.

During such a flow of actions, an ongoing exposure for a live view image is suspended at a timing of the release operation, which causes no live view image of a corresponding frame to be displayed, resulting in a blackout. The blackout continues until capture exposure is performed and a frame of the live view image based on the capture exposure as illustrated in FIG. 2B is displayed.

An example of a technique for preventing such a blackout includes a technique in which an exposure for the live view image, which is performed at a release operation timing, is not suspended. That is, by waiting for the ongoing exposure for the live view image at the release timing to be completed without being suspended and storing the resulting image data in, for example, the frame memory 26A, the live view image of the corresponding frame can be displayed.

After the completion of the exposure for a live view image, preparations for capture exposure are made, and the capture exposure is performed after the preparations are made. Image data regarding the capture exposure is stored in the frame memory 26B. Then, the display of the live view image can be continued by using image data in the frame memory 26A during a duration until live view image data based on the image data regarding the capture exposure can be generated. No blackout thus occurs.

Another technique for preventing a blackout is also possible. For example, in response to the release operation performed while an exposure for the live view image is being performed and writing to the frame memory 26B is being performed, the exposure is suspended, and the latest image having been stored in the frame memory 26A (for example, image data regarding a frame immediately before the frame at which the exposure is suspended) is copied to the frame memory 26B. Then, the display of the live view image is continued by using the image from the frame memory 26B. At this time, the image data regarding the capture exposure is written to the frame memory 26A, and, after the completion of the capture exposure, the live view image based on the image data regarding the capture exposure is displayed.

Such use of the frame memories 26A and 26B makes it possible to prevent the live view image from being interrupted at the time of the release operation.

Further, a similar process makes it possible to cause a live view image to be continuously displayed even during, for example, continuous imaging.

During continuous imaging, capture exposure is repeated with a predetermined period. In a case where the period of capture exposure is longer than one frame period at a frame rate of a live view image, coma-to-coma exposure is performed one or multiple times between capture exposures.

For example, exposure actions such as "capture exposure," "coma-to-coma exposure," "coma-to-coma exposure," "capture exposure," "coma-to-coma exposure," "coma-to-coma exposure," . . . are repeated until the termination of continuous shooting.

In this case, a control similar to the above-described control at the release timing is performed in switching from coma-to-coma exposure to capture exposure, which makes it possible to display a live view image during continuous shooting without causing a blackout.

Figure 3:
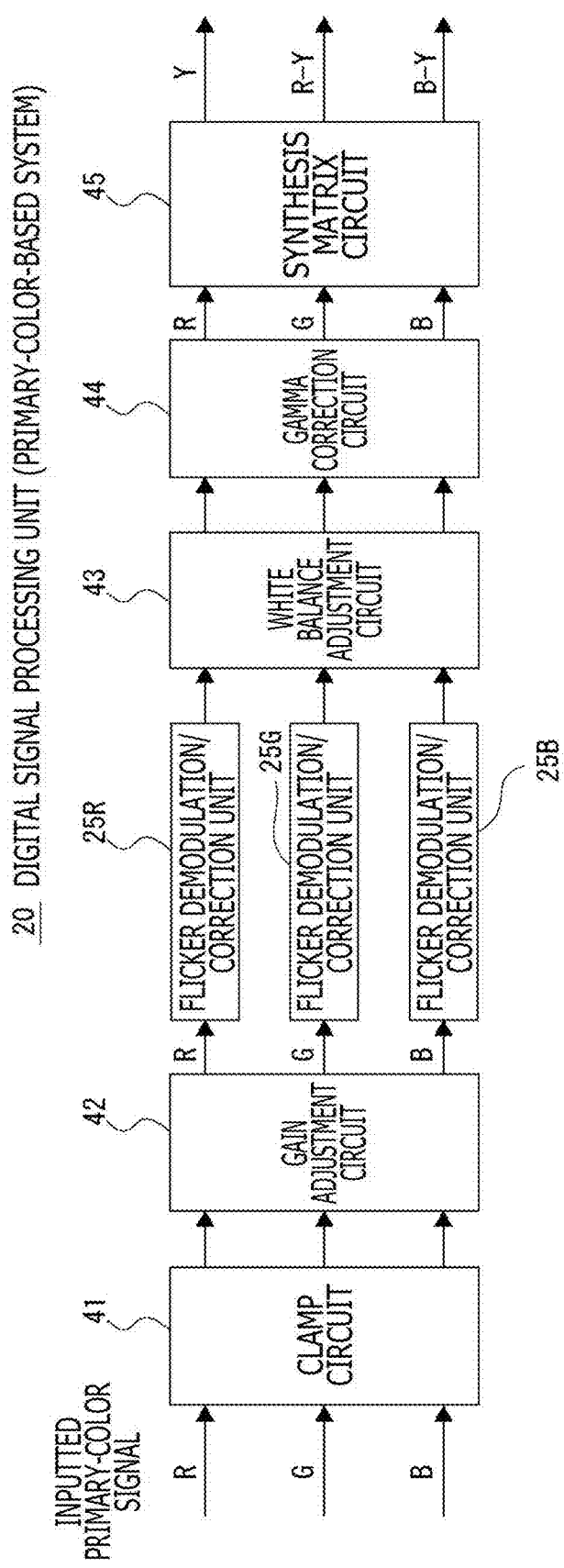
FIG. 3 is a block diagram of a relevant part of a digital signal processing unit of the embodiment.

Next, FIG. 3 illustrates a configuration example of a part of the digital signal processing unit 20, in particular, a configuration example for explaining a location of the flicker demodulation/correction unit 25. FIG. 3 is a configuration example of a primary-color-based system.

In the primary-color-based system, the imaging optical system 11 in FIG. 1 includes a photodecomposition system that splits light from an object into colored lights of RGB colors, and the imaging element 12 is in a form of a three-plate system including respective imaging elements for RGB colors, or the imaging element 12 is in a form of a single-plate system including a single imaging element including respective color filters of RGB colors repeatedly arranged on a light entrance surface in sequence in a screen horizontal direction on a pixel-by-pixel basis.

In the digital signal processing unit 20 in FIG. 3, a black level of an inputted RGB primary color signal is clamped at a predetermined level by a clamp circuit 41 and a gain of the clamped RGB primary color signal is adjusted in accordance with an exposure amount by a gain adjustment circuit 42.

Flicker demodulation/correction units 25R, 25G, and 25B each detect a period of a flicker component and a peak timing of the flicker component for the purpose of the flickerless imaging. The flicker demodulation/correction units 25R, 25G, and 25B are also each capable of a flicker correction process to reduce a flicker component in an RGB primary color signal.

RGB primary color signals passing through the flicker demodulation/correction units 25R, 25G, and 25B are subjected to a white-balance adjustment by a white balance adjustment circuit 43, gradations of the white-balance-adjusted RGB primary color signals are converted by a gamma correction circuit 44, and a luminance signal Y and color-difference signals R-Y and B-Y to be outputted are generated from the gamma-corrected RGB primary color signals by a synthesis matrix circuit 45.

In the primary-color-based system, the luminance signal Y is usually generated after all the processes for the RGB primary color signal are terminated as illustrated in FIG. 3. Accordingly, reducing a flicker component in the RGB primary color signal during the processes for the RGB primary color signal makes it possible to sufficiently reduce both flicker components in each color component and a luminance component.

Incidentally, instead of causing the flicker demodulation/correction units 25R, 25G, and 25B to detect and reduce flicker components in the primary-color signals of RGB colors, respectively, as illustrated in FIG. 3, for example, the flicker demodulation/correction unit 25 may be located on a luminance-signal-Y output side of the synthesis matrix circuit 45 to detect and reduce a flicker component in the luminance signal Y.

<2. Flickerless Imaging and Flicker Correction>

The flickerless imaging will be described.

First, referring to FIG. 4, description will be made on an example of a flicker component generated by a fluorescent lamp by taking an NTSC system as an example. It should be noted here that description will be made on a case where a frame rate is 60 fps (frames per second) and a commercial power frequency is 50 Hz (hertz). Features of a flicker component generated in this case are as follows.

In a single screen, an amount corresponding to a 5/3 period is generated (three frames (field also acceptable) are defined as a repeating period).

The phase changes on a line-by-line basis.

The flicker component can be treated as a sinusoidal wave having a frequency (100 Hz) twice as high as a commercial power frequency (50 Hz).

Figure 4:
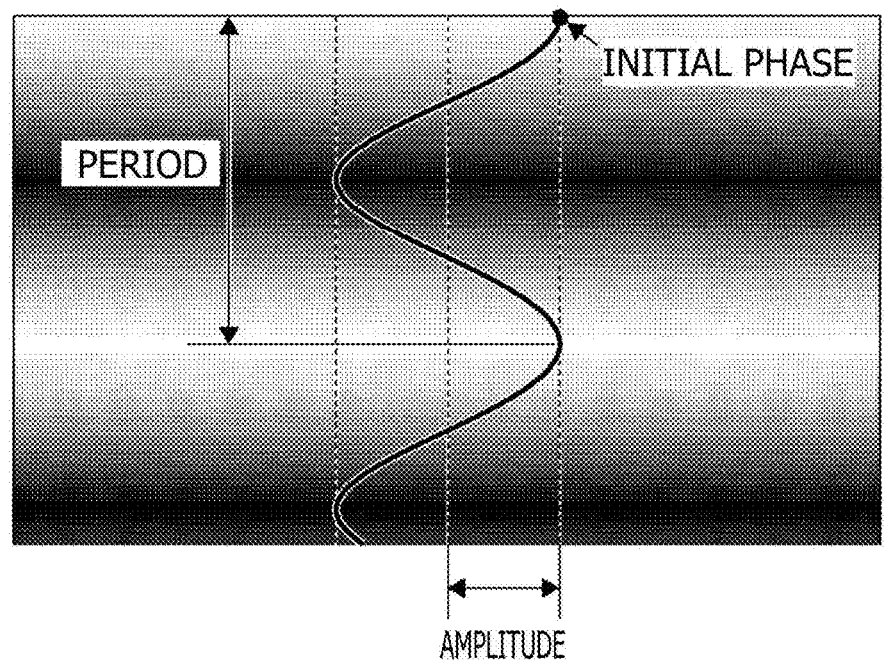
FIG. 4 is an illustration of a phase, a period, and an amplitude of a flicker.

In view of the above-described features, a flicker component as in FIG. 4 is generated during the occurrence of a flicker phenomenon. It should be noted that scanning is assumed to be performed from an upper side (upper portion of the screen) toward a lower side (lower portion of the screen) in FIG. 4.

In the imaging element 12, an exposure timing is different for each horizontal line, which causes an amount of light received to change depending on the horizontal line. This results in the existence of a horizontal line where the image signal has a larger value than an average value and a horizontal line where the image signal has a smaller value than the average value as in FIG. 4 even though illumination with a fluorescent lamp is spatially even.

For example, in a frame in FIG. 4, a peak where a flicker component (amplitude of the flicker component) reaches the maximum is seen on an uppermost horizontal line in an image, or a head line. Further, the flicker component reaches the maximum on a horizontal line offset by an amount corresponding to 3/5 of the total number of lines contained in a single image.

A flicker component can thus be represented by a sin function (sinusoidal wave) having an amplitude, a period, and an initial phase as illustrated in FIG. 4. It should be noted that the initial phase refers to a phase of the head line.

Further, a phase of each horizontal line changes depending on the frame. That is, a horizontal line where the image signal has a larger value than the average value and a horizontal line where the image signal has a smaller value than the average value change on a frame-by-frame basis. The next frame has a sinusoidal wave with a different initial phase. For example, assuming that a flicker caused by a fluorescent lamp occurs at 100 Hz and a frame rate is 60 fps, five periods of the flicker of a fluorescent lamp correspond to three frames in terms of time. Thus, the initial phase becomes the same every three frame. A flicker component thus varies according to the horizontal line and the frame.

Such an imaging enabling reducing an influence of a flicker appearing in an image is the flickerless imaging.

Figure 5:
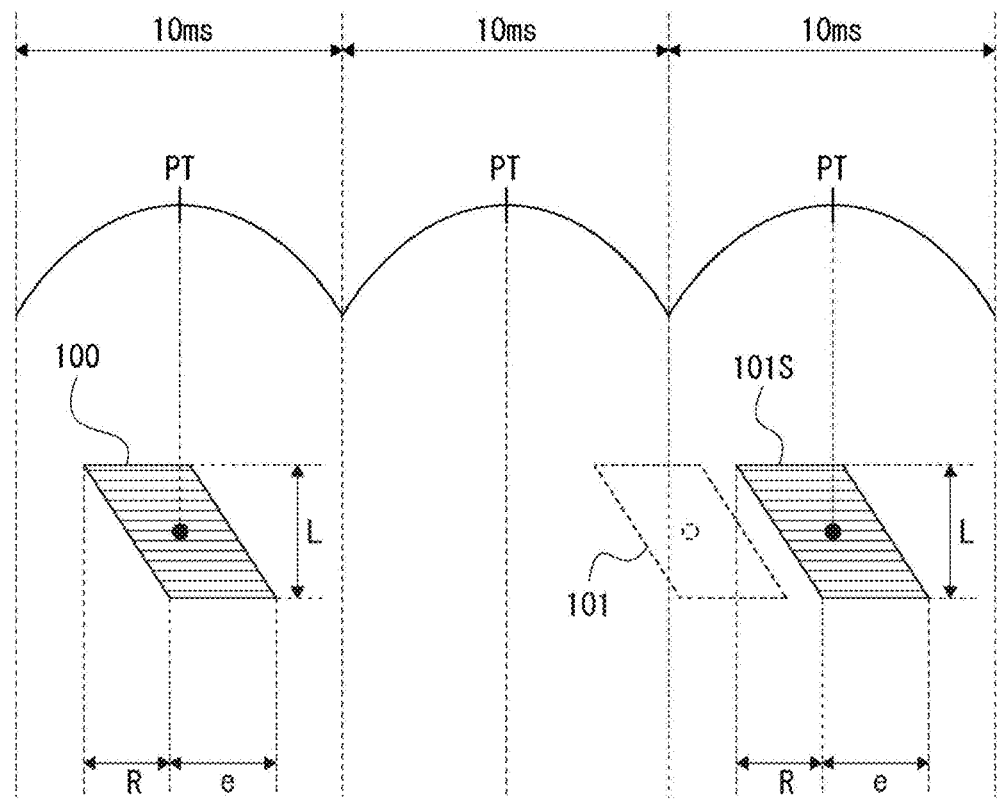
FIG. 5 is an illustration of flickerless imaging.

Description will be made with reference to a schematic diagram in FIG. 5. FIG. 5 illustrates an amplitude of a 10-ms period of a flicker light source. An exposure action 100 is also illustrated. The exposure action 100 is schematically illustrated in a form of a parallelogram defined by the number of vertical lines L, a duration required for reading effective pixels from the head to the end (curtain speed) R, and an exposure duration (shutter speed) e.

For the exposure action 100, the exposure duration is shorter than a single period of a flicker and a timing of the exposure centroid matches a peak timing PT of the flicker. The timing of the exposure centroid refers to a timing corresponding to substantially the middle of an exposure duration of substantially a middle line in a vertical direction of the imaging element.

Such an exposure performed at a timing synchronous with the peak timing PT makes it possible to obtain an image less influenced by a flicker.

Here, it is assumed that a timing of a next exposure action 101 becomes as illustrated due to a period of the exposure action. A period of a flicker and a frame period corresponding to a frame rate of a captured image do not match as described above, and therefore, even though the exposure action 100 is provided at a time point, exposure may be performed during a duration when an amplitude of the flicker is significantly reduced, such as a part corresponding to a valley of a flicker waveform, at another time point as exemplified by the exposure action 101. In this case, a relatively large influence of the flicker is seen in an image.

Accordingly, the timing of the exposure action 101 is delayed to synchronize the timing of the exposure centroid with the peak timing PT of the flicker as exemplified by an exposure action 101S.

By virtue of performing the timing control in this manner, it is possible to reduce an influence of a flicker on each frame. Such imaging accompanied with a control of an exposure timing is referred to as flickerless imaging.

In order to perform such flickerless imaging, it is necessary for the camera control unit 21 (the margin-based flickerless control unit 24) to sense a frequency and a peak timing of a flicker.

In a case of the present embodiment, the flicker demodulation/correction unit 25 (25R, 25G, and 25B) of the digital signal processing unit 20 performs flicker demodulation, detects the peak timing and the frequency, and notifies the camera control unit 21 (the margin-based flickerless control unit 24) of the peak timing and the frequency.

It should be noted that the flicker demodulation/correction unit 25 also performs, by way of example, flicker correction to reduce a flicker component in image data in addition to the flicker demodulation as described above.

Description will be made on the flicker demodulation/correction unit 25 that performs such flicker demodulation and flicker correction with reference to FIG. 6.

Figure 6:
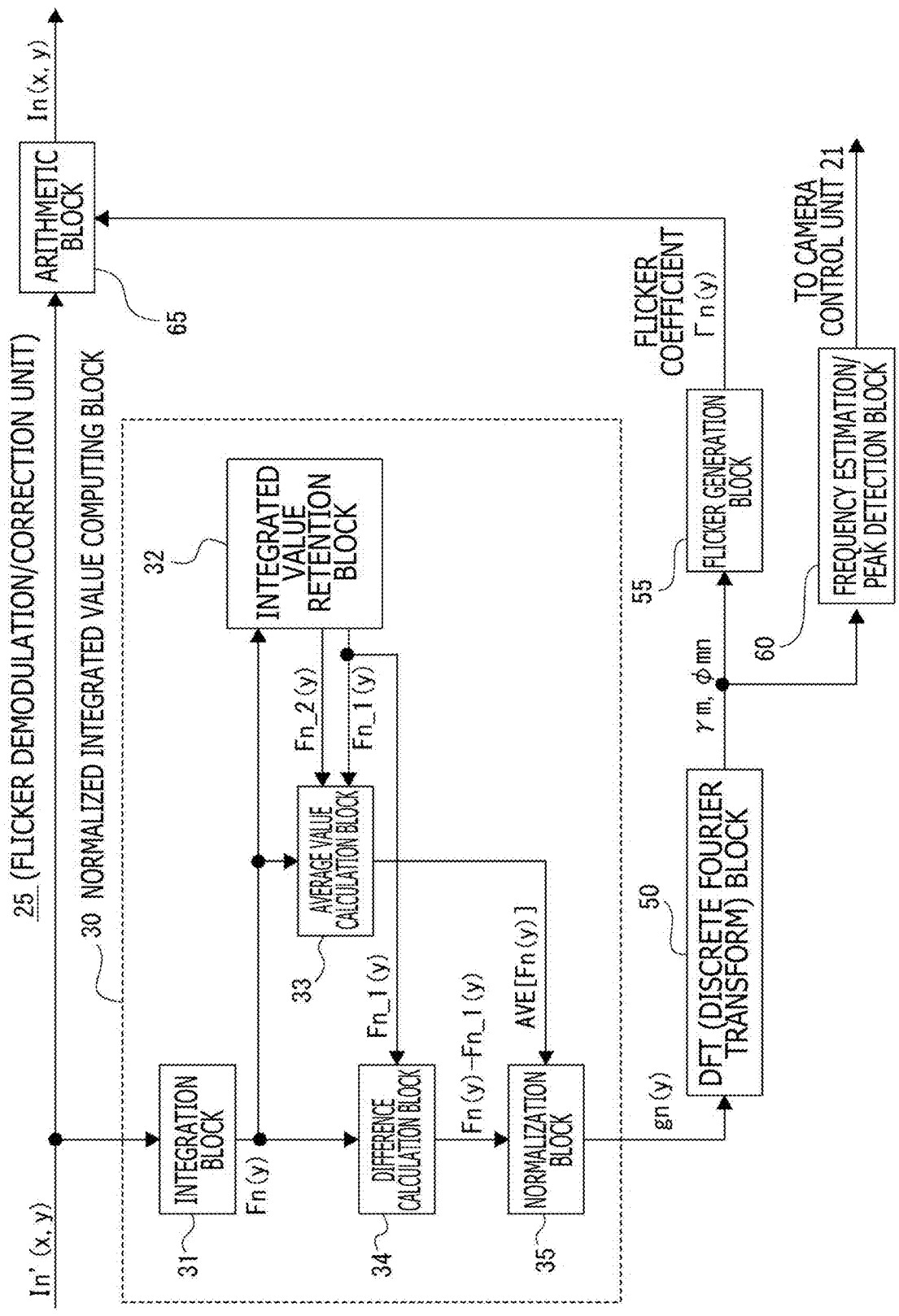
FIG. 6 is a block diagram of a flicker demodulation/correction unit of the embodiment.

It should be noted that, in the description on the flicker demodulation/correction unit 25 with reference to FIG. 6, an inputted image signal refers to the RGB primary color signal or the luminance signal inputted to the flicker demodulation/correction unit 25 (25R, 25G, and 25B) as in FIG. 3, and an outputted image signal refers to an RGB primary color signal or a luminance signal processed by the flicker demodulation/correction unit 25 (25R, 25G, and 25B).

The flicker demodulation/correction unit 25 in FIG. 6 includes, for example, a normalized integrated value computing block 30, a DFT (discrete Fourier transform) block 50, a flicker generation block 55, a frequency estimation/peak detection block 60, and an arithmetic block 65.

The normalized integrated value computing block 30 includes an integration block 31, an integrated value retention block 32, an average value calculation block 33, a difference calculation block 34, and a normalization block 35.

The integration block 31 computes an integrated value Fn(y) by integration across a single line in a screen-horizontal direction of an inputted image signal In'(x, y). The computed integrated value Fn(y) is stored and retained in the integrated value retention block 32 for the purpose of flicker detection for a subsequent frame. The integrated value retention block 32 is configured to be able to retain integrated values for frames necessary for processing (for example, for two frames).

The average value calculation block 33 computes an average value AVE[Fn(y)] of, for example, three integrated values Fn(y), Fn_1(y), and Fn_2(y). It should be noted that Fn_1(y) is an integrated value Fn_1(y) of the same line in a last frame, Fn_2(y) is an integrated value Fn_2(y) of the same line in a second last frame, and these integrated values are values read from the integrated value retention block 32.

The difference calculation block 34 computes a difference between the integrated value Fn(y) supplied from the integration block 31 and the integrated value Fn_1(y) of the last frame supplied from the integrated value retention block 32. A difference value Fn(y)−Fn_1(y), from which an influence of an object is sufficiently removed, clearly indicates how a flicker component (a flicker coefficient) is as compared with the integrated value Fn(y).

Further, the normalization block 35 performs a normalization process including dividing the difference value Fn(y)−Fn_1(y) from the difference calculation block 34 by the average value AVE[Fn(y)] from the average value calculation block 33 to compute a normalized difference value gn(y).

The DFT block 50 applies discrete Fourier transform to data regarding the normalized difference value gn(y) from the normalization block 35, the data corresponding to a single waveform (L line) of a flicker. An amplitude γm and an initial phase φmn of each subsequent flicker component are thus estimated. It should be noted that the initial phase φmn is retained in association with a counter generated in the imaging apparatus 1 every predetermined time (for example, every 0.5 μs (microseconds)).

The initial phase φmn calculated by the DFT block 50 is supplied to the frequency estimation/peak detection block 60. The frequency estimation/peak detection block 60 estimates at least a frequency of a flicker component (light source), in other words, a period of the flicker component, on the basis of the inputted initial phase φmn and, further, detects a timing of a peak of the flicker component. For example, the frequency estimation/peak detection block 60 estimates the frequency of the flicker component from a time lag based on a frame rate and a phase difference of the initial phase φmn. Further, the frequency estimation/peak detection block 60 detects the timing of the peak of the flicker component from, for example, respective counters associated with the initial phase φmn in a first frame and the present initial phase φmn.

For example, assuming that the initial phase φmn is 60 degrees, it is possible to obtain a timing of the appearance of a peak (for example, 90 degrees) of a flicker component, which can be approximated by a sinusoidal wave, by using a time interval between the counters. The peak of the flicker component is a spot where the amplitude of the flicker component reaches the maximum as described above.

The camera control unit 21 (the margin-based flickerless control unit 24) is notified of information obtained by the frequency estimation/peak detection block 60 in this manner.

By knowing the frequency and the peak timing of the flicker, the camera control unit 21 can perform the above-described timing control of the imaging element as the flickerless imaging.

By virtue of including such a flicker demodulation/correction unit 25, the features of a flicker component, i.e., the period, the peak timing, and the like of the flicker component can be detected on the basis of a captured image without the necessity of a separate sensor or the like. This makes it possible to prevent an increase in cost due to an increase in the number of parts. In addition, the imaging apparatus can be downsized. It should be noted that the processing for obtaining the features of a flicker component is not limited to the method described above and a known method is applicable.

Further, the flicker demodulation/correction unit 25 can perform the flicker correction to reduce a flicker component generated in an image signal.

In the flicker generation block 55, a flicker coefficient $\Gamma n(y)$ is computed from the estimation values of $\gamma m$ and $\varphi mn$ from the DFT block 50.

The arithmetic block 65 then adds 1 to the flicker coefficient $\Gamma n(y)$ from the flicker generation block 53 and performs an inverse gain multiplication process to divide the inputted image signal $In'(x, y)$ by a resulting sum $[1+\Gamma n(y)]$.

This causes the flicker component contained in the inputted image signal $In'(x, y)$ to be almost completely removed, so that a signal component $In(x, y)$ contained substantially no flicker component is obtained as an outputted image signal (RGB primary color signal or luminance signal subjected to a flicker reduction process) from the arithmetic block 65.

By virtue of including the flicker demodulation/correction unit 25 as described above, it is possible to achieve a flickerless imaging control and further prevent a decrease in quality of an image by the flicker correction.

It should be noted that, considering that at least the flickerless imaging is to be performed without performing the flicker correction, the configuration in the FIG. 6 without the arithmetic block 65 and the flicker generation block 55 may be provided as a flicker detection unit.

<3. Margin-Based Flickerless Control>

Description will be made below on the margin-based flickerless control in the present embodiment.

This control is intended to reduce the number of times when a live view image is caused to become a non-smooth moving image due to the flickerless imaging in a case where, for example, continuous imaging is performed while the liver view image is being displayed.

First, description will be made on a decrease in display quality of a live view image due to the flickerless imaging with reference to FIG. 7.

Figure 7:
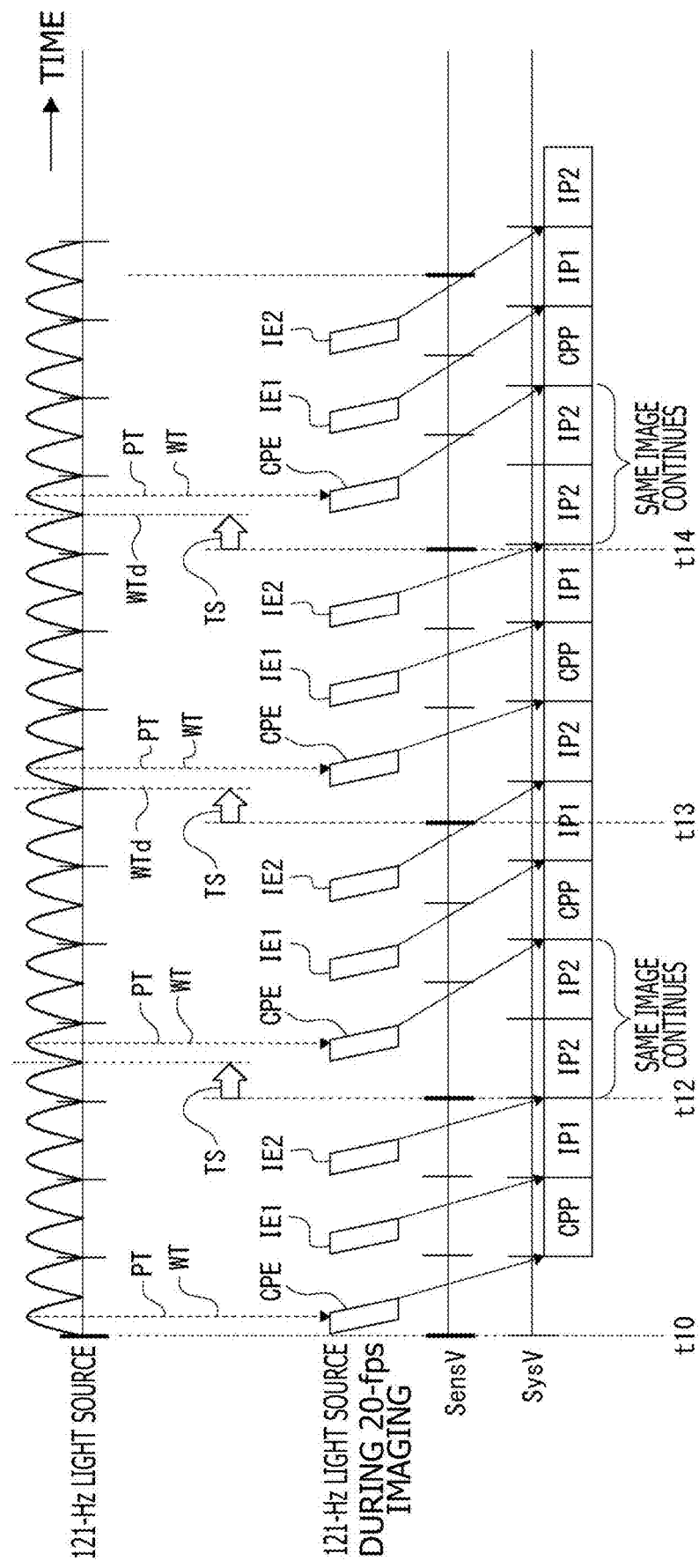
FIG. 7 is an illustration of a case where a live view image becomes non-smooth.

FIG. 7 illustrates a flicker amplitude of a 121-Hz light source and an exposure action for capturing an image at 20 fps under the light source. This exemplifies an action during continuous imaging as an example, illustrating a case where a capture exposure CPE is performed multiple times and two coma-to-coma exposures IE1 and IE2 are performed between one of the capture exposures CPE and the next capture exposure CPE. The exposure action for a single frame is illustrated in a form of a parallelogram determined by the curtain speed, the exposure time, and the number of horizontal lines as in FIG. 5. It should be noted that a parallelogrammatic shape in the drawing is merely schematic and is not intended to strictly indicate the curtain speed, the exposure time, and the number of lines.

A synchronization signal SensV is a synchronization signal responsive to the imaging action of the imaging element 12 and a timing thereof is set variable through a control by the camera control unit 21.

A synchronization signal SysV is a synchronization signal responsive to the display action of the display unit 15 and is provided at a vertical timing at a predetermined frame rate (in this case, 20 fps). For a live view image, an image of each frame is to be displayed at timings according to the synchronization signal SysV.

It is assumed that a user performs an operation for continuous imaging, causing a first capture exposure CPE to be performed at or after a time point t10. In this case, the timing control for the first capture exposure CPE is performed to cause an exposure centroid timing WT to match the peak timing PT of a flicker.

Thereafter, the coma-to-coma exposures IE1 and IE2 are performed at timings according to a 20-fps frame rate.

Regarding the live view image, an LV image CPP based on the capture exposure CPE is displayed in a frame after the termination of the capture exposure CPE, an LV image IP1 based on the coma-to-coma exposure IE1 is displayed in a next frame, and an LV image IP2 based on the coma-to-coma exposure IE2 is displayed in a second next frame.

At or after a time point t12, a timing when the next capture exposure CPE is to be performed comes. However, if the current period is kept without change, the timing of the exposure centroid will fail to match the peak timing PT. Accordingly, a timing control TS is performed to delay a start timing of the capture exposure CPE. This means that the synchronization signal SensV is delayed.

Thus, the capture exposures CPE at or after the time point t12 also corresponds to the flickerless imaging with the exposure centroid timing WT matching the peak timing PT. Thereafter, the coma-to-coma exposures IE1 and IE2 are performed at the timings according to the 20-fps frame rate.

However, in displaying the live view image in this case, the capture exposure CPE is delayed by the timing control TS, which causes the same LV image IP2 to be displayed continuously during a duration of two frames. This is because the capture exposure CPE is not terminated at a time point of the start of the second frame at or after the time point t12.

At each of a time point t13 and a time point t14, the flickerless imaging is also achieved with the exposure centroid timing WT of the capture exposure CPE matching the peak timing PT by performing the timing control TS to delay the synchronization signal SensV.

Regarding the live view image at or after the time point t14, the continuous display of the same LV image IP2 during a duration of two frames occurs due to the delay of the capture exposure CPE.

In a case of the example in FIG. 7, data regarding multiple still images continuously shot obtained by the capture exposures CPE can be provided as images less influenced by a flicker.

However, the same image continues as the live view image at or after the time point t12 or at or after the time point t14 described above. This means a state where a frame rate for a user to see (hereinafter, referred to as "user-viewing frame rate") varies.

In addition, each of a time lag from the capture exposure CPE to the LV image CPP based thereon, a time lag from the coma-to-coma exposure IE1 to the LV image IP1, and a time lag from the coma-to-coma exposure IE2 to the LV image IP2 is latency for the live view image, and, in a case of the example in the drawing, the latency varies (an inclination of an arrow from an exposure termination timing to a display start timing is not constant).

Due to such variations in user-viewing frame rate and in latency, a motion of a live view image is recognized as not being smooth by a user.

In particular, in performing a continuous-shooting operation while following an object in the live view image, an unnatural motion of a moving image, as the live view image, makes it difficult to adjust an angle of view to aim at the object.

Accordingly, in the present embodiment, for the purpose of the margin-based flickerless control, the flickerless imaging is performed in a manner to reduce an influence of a flicker appearing in an image for recording and to prevent the smoothness of the live view image from being impaired as much as possible.

Figure 8:
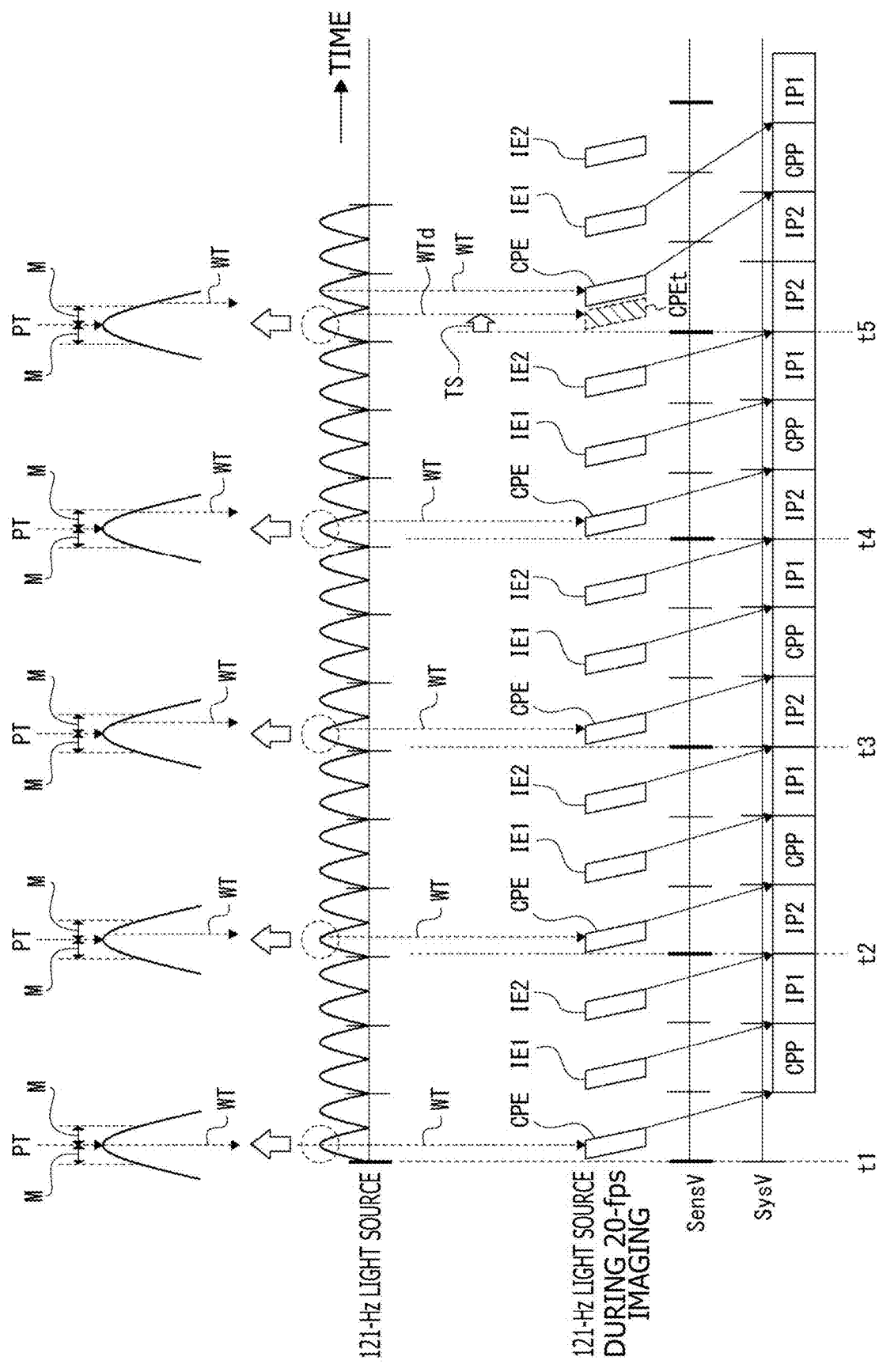
FIG. 8 is an illustration of exposure and live view image display of the embodiment.

Similarly to FIG. 7, FIG. 8 illustrates a flicker of the 121-Hz light source, the capture exposures CPE, the coma-to-coma exposures IE1 and IE2, the synchronization signal SensV, the synchronization signal SysV, and the LV images CPP, IP1, and IP2 that are respective frames of the live view image.

It should be noted that an enlarged diagram is provided on an upper side in the drawing for the purpose of illustrating offsets between the peak timing Pt of a flicker and the exposure centroid timing WT of the capture exposures CPE.

It is assumed that a user performs a continuous imaging operation, causing a first capture exposure CPE to be performed at or after a time point t1. The first capture exposure CPE is subjected to a timing control to cause an exposure centroid timing WT to match the peak timing PT of a flicker as in the case in FIG. 7.

Thereafter, the coma-to-coma exposures IE1 and IE2 are performed at the timings according to the 20-fps frame rate.

Regarding the live view image, an LV image CPP based on the capture exposure CPE is displayed in a frame after the termination of the capture exposure CPE, an LV image IP1 based on the coma-to-coma exposure IE1 is displayed in a next frame, and an LV image IP2 based on the coma-to-coma exposure IE2 is displayed in a second next frame.

At or after a time point t2, a timing when the next capture exposure CPE is to be performed comes. The timing when the next capture exposure CPE is to be performed is assumed to be a timing with the exposure period kept. This means that it is a timing when a duration length from a start timing of an exposure duration of the previous coma-to-coma exposure IE2 to a start timing of an exposure duration of the current capture exposure CPE and a duration length from a start timing of an exposure duration of the coma-to-coma exposure IE1 before the previous one to the start timing of the exposure duration of the previous coma-to-coma exposure IE2 are the same.

Thinking of such a capture exposure CPE with the exposure period kept, the exposure centroid timing WT does not match the peak timing PT.

However, in this case, an offset amount of the exposure centroid timing WT from the peak timing PT falls within a range of a margin M as illustrated in the enlarged diagram.

The margin M is set as a range allowing an image to be evaluated as not being influenced by a flicker even though the exposure centroid timing WT is offset from the peak timing PT.

In a case where the offset amount falls within the range of the margin M, the timing control to delay the start timing of the capture exposure CPE to cause the exposure centroid timing WT to match the peak timing PT is not performed. This means that a period of the 20-fps frame rate of the synchronization signal SensV is maintained and the capture exposure CPE is performed without change.

Further, the coma-to-coma exposures IE1 and IE2 are then similarly performed at the timings according to the 20-fps frame rate.

An offset amount of the exposure centroid timing WT from the peak timing PT falls within the range of the margin M also at each of a time point t3 and a time point t4 as illustrated in the enlarged diagram. Accordingly, the timing control to delay the start timing of the capture exposure CPE to cause the exposure centroid timing WT to match the peak timing PT is not performed. This means that the capture exposure CPE and the coma-to-coma exposures IE1 and IE2 are performed with the period of the 20-fps frame rate maintained.

For a capture exposure CPEt after a time point t5, an offset amount of an exposure centroid timing WTd from the peak timing PT is assumed to exceed the range of the margin M.

In this case, the timing control TS that delays the start timing to cause the exposure centroid timing WT to match the peak timing PT is performed and the capture exposure CPE is performed.

Thus, it is switched whether or not the timing control TS as flickerless imaging is to be performed in accordance with a relation between the offset amount of the exposure centroid timing WT from the peak timing PT and the margin M.

This makes it possible to reduce the number of times when the user-viewing frame rate and the latency of the live view image change. In a case of the example in the drawing, the LV images CPP, IP1, and IP2 are sequentially displayed at a constant frame rate and a latency before the time point t5, enabling a smooth moving image to be displayed.

At or after the time point t5, the user-viewing frame rate and the latency vary due to the execution of the timing control TS. However, the number of times when such a state occurs can be reduced as compared with the action in FIG. 7, and thus a user can be less likely to feel impairment of the smoothness of the live view image as a moving image.

In addition, even image data resulting from no timing control TS being performed provides an image where almost no influence of a flicker is seen, and thus the quality of the image to record can also be maintained.

Moreover, even a minor influence of a flicker due to a slight offset between the peak timing PT and the exposure centroid timing WT is reduced by performing the flicker correction as described with reference to FIG. 6, which makes it possible to remove almost all the influence of the flicker and to record a high-definition image.

Description will be made on a processing example of the margin-based flickerless control unit 24 for achieving a margin-based flickerless imaging action with reference to FIG. 9. It should be noted that the margin-based flickerless control unit 24 is simply written as "control unit 24" in the description of FIG. 9.

Figure 9:
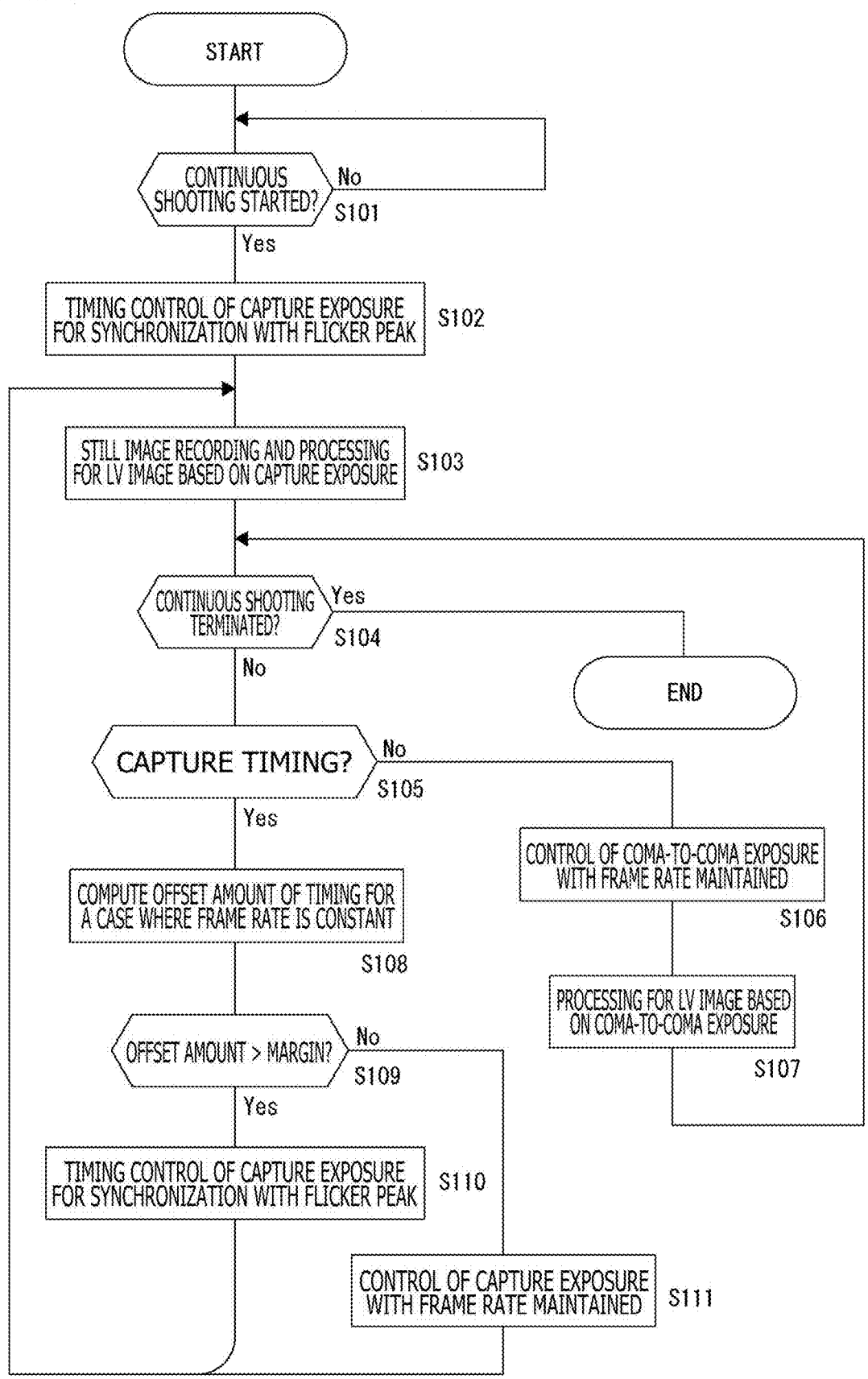
FIG. 9 is a flowchart of a margin-based flickerless control of the embodiment.

FIG. 9 illustrates a processing example of the control unit 24 during a duration when the continuous imaging operation is performed, for example, a duration when a user is kept pressing the release button as a continuous shooting mode.

In response to the start of the continuous imaging operation, the control unit 24 proceeds from Step S101 to Step S102, performing the timing control as the flickerless imaging for the first capture exposure CPE. For example, the exposure timing is controlled to cause the exposure centroid timing WT to match the peak timing PT.

In Step S103, the control unit 24 causes the digital signal processing unit 20 to perform still image recording and the image processing for live view display based on the capture exposure CPE.

While the continuous imaging operation continues, the control unit 24 proceeds from Step S104 to Step S105.

The control unit 24 proceeds from Step S105 to Step S108 when the timing of the capture exposure CPE is based on the synchronization signal SensV and otherwise proceeds from Step S105 to Step S106. Thus, at a time point after the processing according to the capture exposure CPE is performed in Step S103, the control unit 24 performs the timing control for the coma-to-coma exposure IE1 in Step S106. In this case, the coma-to-coma exposure IE1 with a period based on the synchronization signal SensV kept is performed, and, in Step S107, the digital signal processing unit 20 is caused to perform image processing for live view display according to the coma-to-coma exposure IE1.

Thereafter, proceeding to Steps S104, S105, S106, and S107, the control unit 24 causes the coma-to-coma exposure IE2 and the image processing for live view display according thereto to be performed.

When a next timing of the capture exposure CPE is reached, the control unit 24 proceeds from Step S105 to Step S108. In this case, the control unit 24 computes an offset amount between the exposure centroid timing WT resulting from performing the capture exposure CPE at a timing with the period based on the synchronization signal SensV being maintained and the peak timing PT.

The control unit 24 then makes a comparison between the offset amount and the margin M in Step S109.

In a case where the offset amount is larger than the margin M, the control unit 24 performs the timing control as the flickerless imaging in Step S110, causing the exposure centroid timing WT to match peak timing PT.

In contrast, in a case where the offset amount is within the range of the margin M, the control unit 24 proceeds to Step S111, causing the capture exposure CPE to be performed with the current exposure period being maintained.

The above processes from Step S103 to Step S111 are repeated until the continuous imaging operation is determined to be terminated in Step S104.

Thus, the margin-based flickerless imaging as in FIG. 8 is performed.

It should be noted that the above example is described as an action during continuous imaging but is applicable even to live view display prior to capturing an moving image or a single still image in addition to during continuous imaging, and, in a case where the flickerless imaging is to be performed, exposure is performed with the period unchanged (consequently, the peak timing PT and the exposure centroid timing WT are offset from each other) as long as an offset between the peak timing PT and the exposure centroid timing WT falls within the range of the margin M, which makes it possible to achieve smooth live view display.

<4. Setting Example of Margin>

A setting example of the margin M will be described.

The margin M only has to be set in accordance with an amplitude or a period of a flicker, or only has to be set as a range allowing an offset amount between a predetermined timing of an exposure duration, such as the exposure centroid timing WT, and the peak timing PT to be evaluated as that no influence of the flicker appears in an image.

The imaging apparatus 1 only has to include a fixed single set value as such a margin M. For example, it is only sufficient if a single set value is provided as the margin M applicable to various imaging modes or the like.

However, the range allowing no influence of a flicker to be seen is supposed to vary in accordance with various conditions. Accordingly, setting of the margin M as described below is also possible.

Figure 10:
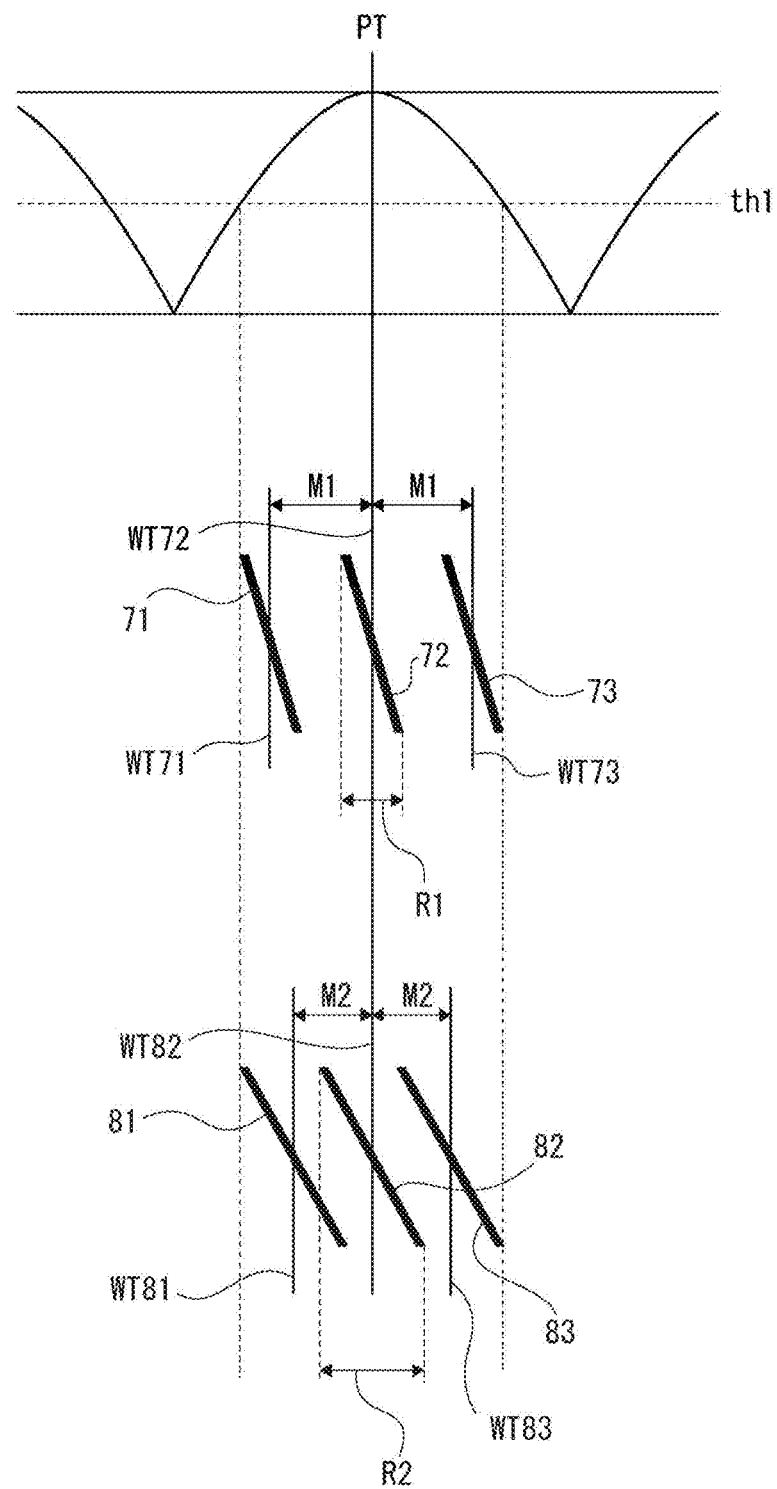
FIG. 10 is an illustration of a margin setting example according to a curtain speed of the embodiment.

FIG. 10 illustrates a relation between a curtain speed and a margin.

It is assumed that, as long as exposure is performed during a duration in which an amplitude value of a flicker is, for example, equal to or more than a threshold th1, almost no influence of the flicker can be seen in an image.

Exposure actions 71, 72, and 73 at a curtain speed R1 are schematically indicated by slanted lines, and respective exposure centroids thereof are referred to as exposure centroid timings WT71, WT72, and WT73.

It should be noted that the exposure actions 71, 72, and 73 do not mean that exposure is to be performed for three times but exemplify patterns different in exposure duration with respect to a flicker period.

FIG. 10 illustrates that, in a case where the curtain speed is R1, performing exposure during a duration within a range defined from the exposure action 71 to the exposure action 73 causes the amplitude value of a flicker during the exposure duration to become equal to or more than the threshold th1. This means that an image is hardly influenced by a flicker irrespective of which one of the exposure centroid timings WT71, WT72, and WT73 is the exposure centroid timing WT.

Accordingly, in this case, the margin M can be set as a margin M1 illustrated before and after the peak timing PT.

In addition, similarly, exposure actions 81, 82, and 83 at a curtain speed R2 are schematically indicated by slanted lines, and respective exposure centroids thereof are referred to as exposure centroid timings WT81, WT82, and WT83.

This illustrates that, in a case where the curtain speed R2 is slower than the curtain speed R1, performing exposure during a duration within a range defined from the exposure action 81 to the exposure action 83 causes the amplitude value of a flicker during the exposure duration to become equal to or more than the threshold th1.

Then, the allowable exposure centroid timing WT falls within a range defined from the exposure centroid timings WT81 to WT83. Accordingly, the margin M can be set as a margin M2 illustrated before and after the peak timing PT.

Thus, it is possible to set the margin M according to the curtain speed. Accordingly, in a case where the curtain speed changes due to a change of the imaging mode or replacement of a replacement lens, it is desirable that the margin M be also changed.

For example, the margin M can be modulated as follows with reference to, for example, the margin M1 in FIG. 10.

$$M2 = M1 - \frac{R2 - R1}{2} \quad (R1 < R2) \qquad \text{[Math. 1]}$$

In addition, the margin M can also be dynamically set according to an exposure shortfall in a case where the peak timing PT is caused to match the exposure centroid timing WT.

Figure 11:
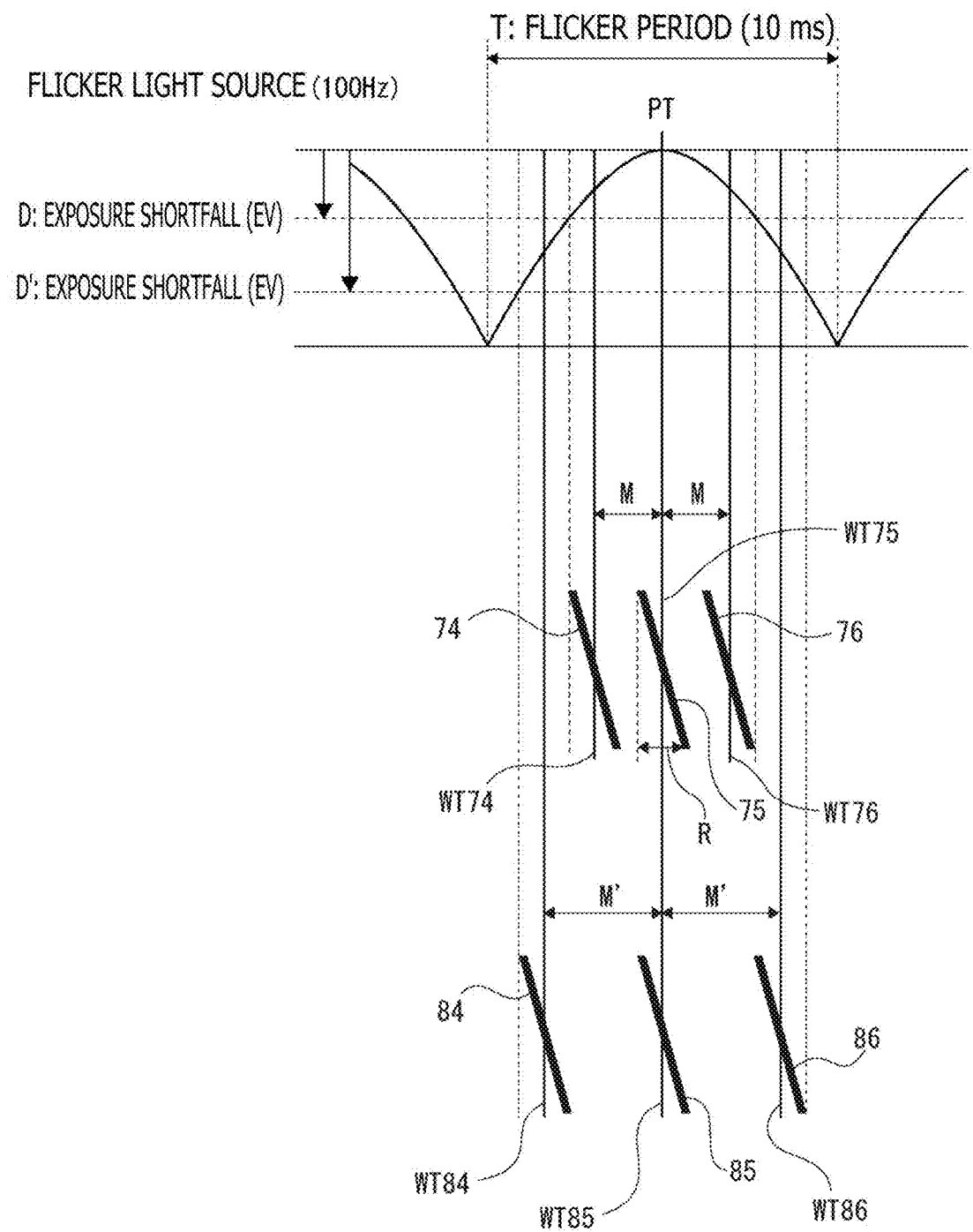
FIG. 11 is an illustration of a margin setting example according to an exposure shortfall of the embodiment.

FIG. 11 illustrates that, in a flicker period T, the margin M is set on the assumption of, as an exposure shortfall from the peak timing PT, an exposure shortfall D that can be evaluated as that no influence of a flicker appears in an image.

The exposure shortfall is, for example, a difference between an exposure amount from a flicker light source obtainable when the peak timing PT and the exposure centroid timing WT match each other and an exposure amount from the flicker light source obtainable when the exposure centroid timing WT does not match the peak timing PT.

Exposure actions 74, 75, and 76 at a curtain speed R illustrated each refer to exposure capable of maintaining an image quality to a certain extent on the assumption of the exposure shortfall D.

For example, even when the peak timing PT and the exposure centroid timing WT are offset from each other, an exposure amount comparable to that, in a case where they are not offset can be ensured even by correcting an exposure shortfall by a gain process for the flicker correction through the digital signal processing unit 20 (flicker demodulation/correction unit 25). However, since the gain process causes an image quality degradation, it is not desirable that an exposure shortfall correctable by the gain process be set large without reason. Accordingly, the correctable exposure shortfall D is set within an allowable range in view of a degree of image quality degradation due to the gain process.

Then, in a case where the exposure shortfall D is set as in the drawing, it is only sufficient if the margin M is set within a range of exposure centroid timings WT74, WT75, and WT76.

Here, it is assumed that the exposure shortfall is set as illustrated as an exposure shortfall D'.

For example, the degree of image quality degradation due to the gain process differs with a performance of the imaging element 12, an imaging mode, or the like. In addition, a required image quality also differs with a product/model as a camera. Accordingly, a larger exposure shortfall D' can be set in some cases.

In this case, exposure may be performed during a duration as illustrated as exposure actions 84, 85, and 86 at the same curtain speed R. This means that it is only sufficient if a margin M' is set to cause a range of the exposure centroid timings WT84, WT85, and WT86 to be covered.

The margin M according to the exposure shortfall D as described above is obtained as follows.

$$M = \left(1 - \frac{\sin^{-1}(2^{-D})}{\pi}\right) \times \frac{T}{2} \qquad \text{[Math. 2]}$$

In addition, the margin M may be set variable in accordance with a size of an image read from the imaging element 12.

Figure 12:
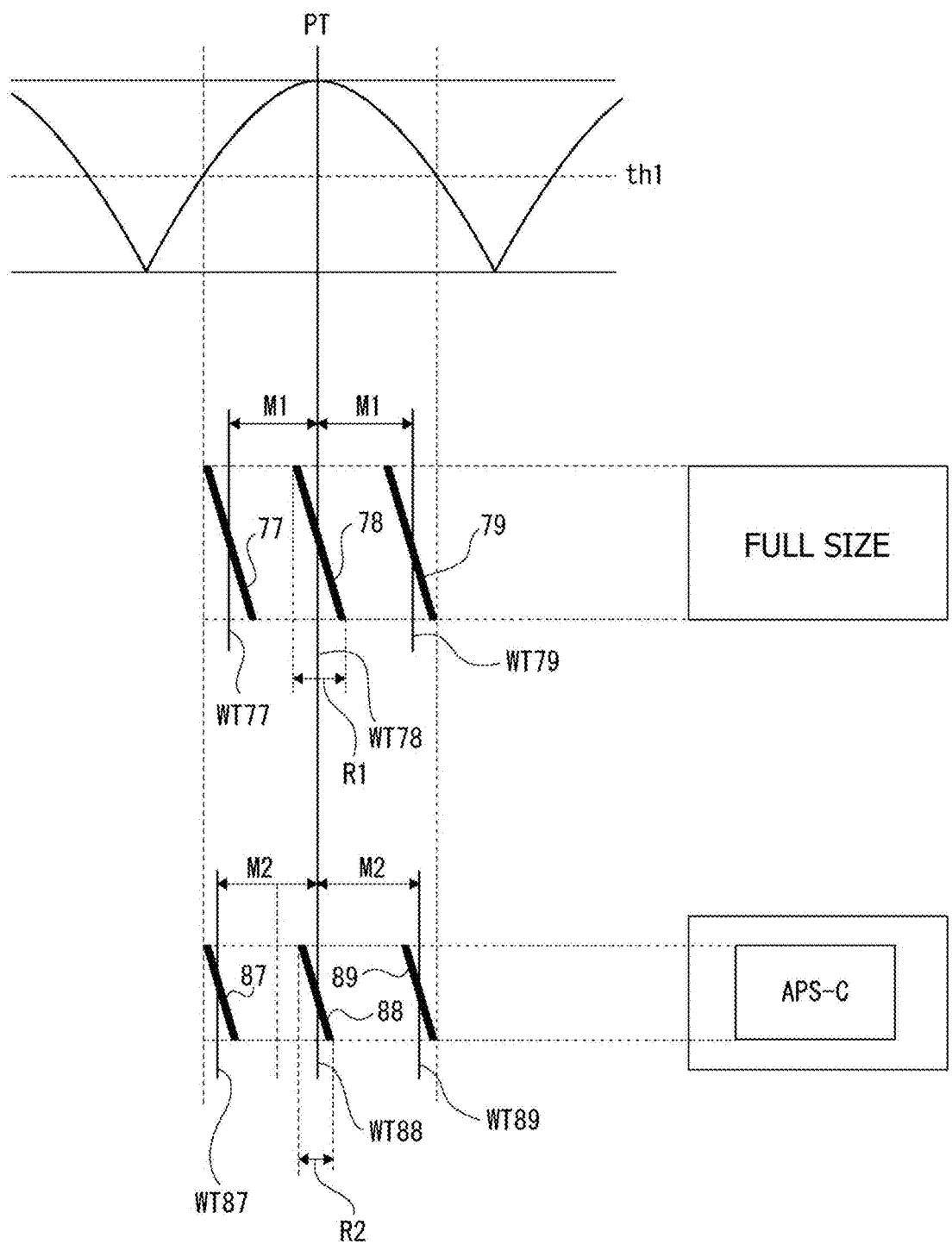
FIG. 12 is an illustration of a margin setting example according to a read image of the embodiment.

FIG. 12 illustrates a case where a full size (36.0 mm×24.0 mm) is to be read from the imaging element 12 and a case where an APS-C size (22.4 mm×15.0 mm) is to be read.

A flicker amplitude value that can be evaluated as that no influence of a flicker appears in an image is assumed to be the threshold th1 or more. Exposure actions 77, 78, and 79 for full-size reading and exposure actions 87, 88, and 89 for the APS-C size have different curtain speeds, such as the curtain speed R1 and the curtain speed R2 illustrated, due to a difference in the number of pixels (the number of lines) resulting from a difference in reading range within a screen.

Accordingly, it is suitable that the margin M1, which covers exposure centroid timings WT77, WT78, and WT79, be applied for the full-size reading and the margin M2, which covers exposure centroid timings WT87, WT88, and WT89, be applied for the APS-C reading.

Although the various examples of the setting of the margin M are described above, the other various setting examples of the margin M are possible in addition thereto.

For example, the margin M varies with an allowable degree of an influence of a flicker. For example, while being narrowed for an image for recording, the margin M may be widened for a duration when only exposure for a live view image is performed (i.e., a duration when no capture exposure is performed) during standby for release or the like to relax the flickerless control. This makes it possible to reduce opportunities for the above-described timing control TS to be performed for exposure for a live view image, enabling further improving the smoothness of the live view image as a moving image.

In addition, regarding the configuration example of the flicker demodulation/correction unit 25 illustrated in FIG. 6, the example in which the flicker correction is to be performed is described.

It is also possible to switch whether or not the flicker correction is to be performed on a mode basis. Then, the margin M may be changed according to whether or not the flicker correction is to be performed.

This means that this is because it can be evaluated that almost no influence appears in an image in a case where the flicker correction is to be performed even though the margin M is set as a wider range than that in a case where the flicker correction is not to be performed. In other words, to obtain an image quality comparable to that, in a case where the flicker correction is not performed, the margin M is widened while the flicker correction is being performed, which makes it possible to reduce the number of times when variations in user-viewing frame rate and latency occur.

<5. Summary and Modification Examples>

According to the imaging apparatus 1 or the imaging control apparatus (the camera control unit 21) of the above-described embodiment, the following effects can be enjoyed.

The imaging apparatus 1 or the camera control unit 21 of the embodiment includes a control unit (the margin-based flickerless control unit 24) that performs the margin-based flickerless control where the timing control TS is performed, on the basis of the period of a detected flicker component and the peak timing PT of the flicker component, to synchronize a specific timing within an exposure duration with the peak timing PT, and where the timing control TS is not performed as long as an offset amount between the specific timing and the peak timing PT falls within the set margin M.

This makes it possible to reduce opportunities to perform a control causing the start of the exposure duration to be delayed. As a result, it is possible to reduce the number of times when the user-viewing frame rate of image data based on exposure changes and when the latency to the output of an image changes.

In addition, as a result of not performing the timing control TS, a release lag may be reduced.

Description is made on the example in which the margin-based flickerless control unit 24 of the embodiment performs the margin-based flickerless control when continuous imaging is performed while a live view image is being displayed.

This makes it possible to reduce the number of times when the user-viewing frame rate of the live view image changes and when the latency to the output of the live view image changes. Thus, display of a non-smooth or less responsive live view image can be reduced even though the flickerless imaging is performed. Thus, in continuing the continuous imaging operation while checking an object in the live view image, a user can easily aim at the object.

It should be noted that such a margin-based flickerless control is beneficial not only for continuous imaging but also for live view display prior to the start of capturing a still image or live view display in a motion mode or the like. That is, even when exposure for live view display is performed, while the timing control to cause the timing of exposure to match the peak of a flicker, the timing control is not performed to cause the timing to match the peak as long as an offset amount falls within the margin. This makes it possible to reduce the number of times when the user-viewing frame rate of image data based on exposure changes and when the latency to the output of an image changes, and consequently, to display a smooth live view image.

In the embodiment, description is made on the example in which, in a case where the capture exposure CPE for generating a single still image constituting continuously shot images and a live view image and one or multiple coma-to-coma exposures (for example, the coma-to-coma exposures IE1 and IE2) for generating the live view image are repeated during the continuous imaging, the margin-based flickerless control unit 24 performs the timing control for the first capture exposure CPE after the start of continuous imaging, and, for the second and subsequent capture exposures CPE, does not perform the timing control TS as long as an offset amount of the specific timing falls within the margin M but performs the timing control TS unless the offset amount of the specific timing falls within the margin M (see FIG. 8 and FIG. 9).

For the first image, the specific timing in the exposure duration (for example, the exposure centroid timing WT) is caused to match the peak timing PT of a flicker, which makes it possible to obtain image data less influenced by the flicker. For the capture exposures CPE providing the second and subsequent images, the timing control TS is performed for a minimum number of times as needed, which makes it possible to reduce an influence of the flicker on each of images captured by continuous shooting and to improve the smoothness of the live view image.

In the embodiment, provided is an example in which, on the assumption that the exposure period is kept to cause a duration length from the start timing of the previous exposure duration to the start timing of the current exposure duration and a duration length from the start timing of one before the previous exposure duration to the start timing of the previous exposure duration to be the same, it is determined whether or not the offset amount of the specific timing in the current exposure duration from the peak timing PT falls within the margin M.

This means that, in the example, it is determined whether or not the timing control TS is to be performed according to how much the exposure centroid timing WT is offset from the peak timing PT with the exposure period kept.

In this manner, the control is performed to cause a state where the exposure period is kept constant to continue as long as possible. This makes it possible to reduce, for example, changes of the user-viewing frame rate and the latency of a live view image.

In the embodiment, the above-described specific timing is the exposure centroid timing WT. This means that it is a timing corresponding to substantially the middle of an exposure duration of substantially a middle line in the vertical direction of the imaging element.

The timing substantially in the middle of the frame is caused to match the peak timing of a flicker, which makes it possible to enjoy a flickerless effect in the most optimal manner. It should be noted that the exposure centroid is not necessarily precise. Accordingly, the specific timing does not necessarily precisely match the exposure centroid.

Alternatively, the margin M may be set to cause the offset amount from the peak timing PT to be determined with reference to the start timing or the termination timing of exposure.

In the embodiment, description is made on the example in which the margin M is set in accordance with the curtain speed (see FIG. 10).

This is because a range of the offset amount of the timing when a flicker is less influenceable as the curtain speed increases.

It is exemplified by a case where a curtain speed differs between an electronic shutter and a mechanical shutter and a case where the curtain speed of the electronic shutter is changed, for example.

Accordingly, in a case where a margin is set in accordance with a curtain speed, the margin can be increased for a high curtain speed, whereas the margin can be reduced for a slow curtain speed. This makes it possible to increase, within a range that can be evaluated as that no influence of a flicker appears, the margin as much as possible in accordance with the curtain speed. Thus, changes of the user-viewing frame rate and the latency can be reduced as much as possible in accordance with the curtain speed and even the quality of a live view image can be improved.

In addition, the control can be applied in respective states suitable to modes different in curtain speed, for example, modes for different image sizes such as the full size and the APS-C size.

In the embodiment, description is made on the example in which the margin M is set according to an exposure shortfall from a level at the peak timing PT of a flicker component (see FIG. 11).

By virtue of setting the margin according to the exposure shortfall, the margin can be dynamically increased as much as possible within a range evaluated as that no influence of a flicker appears according to the exposure shortfall. Thus, changes of the user-viewing frame rate and the latency can be reduced as much as possible, and even the quality of a live view image can be improved.

In the embodiment, description is made on the example in which the margin M is changed according to whether or not the flicker correction to correct image data by using a gain is to be performed, the gain being set for each line on the basis of the period of a detected flicker component and the peak timing of the flicker component.

In a case where the flicker correction is to be performed, the margin is increased, which makes it possible to further reduce the number of times when the user-viewing frame rate and the latency change. This also leads to an improvement in quality of a live view image.

In the embodiment, description is made on the example in which the margin M is set according to the number of pixels read from the imaging element. For example, for modes for different image sizes such as the full size and the APS-C and the different numbers of read pixels, the curtain speed also changes, and therefore, it is favorable that the margin be set in accordance with the curtain speed.

Needless to say, it is also favorable that the margin be set according to all-pixel reading/partially skip reading or the like instead of full size/APSC.

In addition, in the embodiment, description is made on the example in which the margin is set according to whether or not the exposure is for an image to read. For example, an image used merely for live view display has a relatively large degree of allowance against an influence of a flicker. In contrast, it is desired to further reduce an influence of a flicker on an image to record for the purpose of quality maintenance. Accordingly, it is favorable that the margin be set variable according to whether or not the exposure is for an image to record. In particular, in this case, the number of times when the user-viewing frame rate and the latency change can be further reduced by increasing the margin during live view display, which leads to an improvement in quality of a live view image.

In addition, in a case where the exposure is for an image to record, the margin is set narrower than that during a duration when no exposure for an image to record is performed, which is suitable for improving the quality of the image to record.

A program of the embodiment is a program that causes an arithmetic processing apparatus such as a CPU to perform the above-described margin-based flickerless control.

That is, the program of the embodiment is a program that causes an arithmetic processing apparatus to carry out a control, i.e., the above-described margin-based flickerless control, to perform, on the basis of the period of a detected flicker component and the peak timing PT of the flicker component, the timing control TS to synchronize the specific timing (for example, the exposure centroid timing WT) within the exposure duration with the peak timing PT, and not to perform the timing control TS as long as an offset amount of the specific timing falls within the margin M, which is set as an offset allowance from the peak timing PT.

By virtue of such a program, the above-described camera control unit 21 can be implemented by an arithmetic processing apparatus such as a microcomputer.

These programs can be recorded in advance in an HDD, which serves as a recording medium and is installed in equipment such as a computer apparatus, a ROM within a microcomputer including a CPU, or the like. Alternatively, the program can also be temporarily or permanently stored (recorded) in a removable recording medium such as a flexible disk, a CD-ROM (Compact Disc Read Only Memory), an MO (Magneto Optical) disc, a DVD (Digital Versatile Disc), a Blu-ray Disc (registered trademark), a magnetic disk, a semiconductor memory, or a memory card. Such a removable recording medium can be provided as what is called package software.

In addition, such a program can be downloaded from a download site over a network such as LAN (Local Area Network) or the Internet in addition to being installed in a personal computer or the like from the removable recording medium.

It should be noted that the effects described herein are merely by way of example but not limited thereto and another effect is also possible.

It should be noted that the present technology can have the following configurations.

(1)
An imaging apparatus including:
a control unit configured to perform a margin-based flickerless control where a timing control is performed, on a basis of a period of a detected flicker component and a peak timing of the flicker component, to synchronize a specific timing within an exposure duration with the peak timing and where the timing control is not performed as long as an offset amount between the specific timing and the peak timing falls within a set margin.

(2)
The imaging apparatus according to (1), in which
the control unit is configured to perform the margin-based flickerless control in a case where continuous imaging is performed while a live view image is being displayed.

(3)
The imaging apparatus according to (2), in which,
in a case where a capture exposure for generating both a single still image constituting continuously shot images and the live view image and one or multiple coma-to-coma exposures for generating the live view image are repeated during the continuous imaging,
the control unit is configured to perform the timing control for a first capture exposure after start of the continuous imaging, and,
for second and subsequent capture exposures, the control unit is configured not to perform the timing control as long as the offset amount of the specific timing falls within the margin but is configured to perform the timing control unless the offset amount of the specific timing falls within the margin.

(4)
The imaging apparatus according to any one of (1) to (3), in which
a duration length from a start timing of a previous exposure duration to a start timing of a current exposure duration and a duration length from a start timing of an exposure duration before the previous exposure duration to the start timing of the previous exposure duration are the same, and the control unit is configured to determine whether or not the offset amount of the specific timing in the current exposure duration from the peak timing falls within the margin.

(5)
The imaging apparatus according to any one of (1) to (4), in which
the specific timing is a timing of an exposure centroid.

(6)
The imaging apparatus according to any one of (1) to (5), in which
the margin is set in accordance with a curtain speed.

(7)
The imaging apparatus according to any one of (1) to (6), in which
the margin is set according to an exposure shortfall from a peak level of the flicker component.

(8)
The imaging apparatus according to any one of (1) to (7), in which
a different value is set as the margin according to whether or not flicker correction is to be performed on the basis of the period of the detected flicker component and the peak timing of the flicker component.

(9)
The imaging apparatus according to any one of (1) to (8), in which
the margin is set according to the number of pixels read from an imaging element.

(10)
The imaging apparatus according to any one of (1) to (9), in which
the margin is set according to whether or not exposure is for an image to record.

(11)
The imaging apparatus according to (10), in which,
in a case where the exposure is for the image to record, the margin is set narrower than that during a duration when the exposure for the image to record is not performed.

(12)
An imaging control method in which
an imaging control apparatus performs a margin-based flickerless control where a timing control is performed, on a basis of a period of a detected flicker component and a peak timing of the flicker component, to synchronize a specific timing within an exposure duration with the peak timing and where the timing control is not performed as long as an offset amount of the specific timing falls within a margin set as an offset allowance from the peak timing.

(13)
A program configured to cause an arithmetic processing apparatus to perform:
a margin-based flickerless control where a timing control is performed, on a basis of a period of a detected flicker component and a peak timing of the flicker component, to synchronize a specific timing within an exposure duration with the peak timing and where the timing control is not performed as long as an offset amount of the specific timing falls within a margin set as an offset allowance from the peak timing.

REFERENCE SIGNS LIST

1: Imaging apparatus
11: Imaging optical system
12: Imaging element
13: Analog signal processing unit
14: Recording control unit
15: Display unit
16: Communication unit
17: Operation unit
18: AE demodulation unit
19: Memory unit
20: digital signal processing unit
21: Camera control unit
22: Driver unit
24: Margin-based flickerless control unit
25, 25R, 25G, 25B: Flicker demodulation/correction unit
26: Temporary storage unit
26A, 26B: Frame memory

The invention claimed is:

1. An imaging apparatus comprising:
a control unit configured to perform a margin-based flickerless control where a timing control is performed, on a basis of a period of a detected flicker component and a peak timing of the flicker component, to synchronize a specific timing within an exposure duration with the peak timing and where the timing control is not performed as long as an offset amount between the specific timing and the peak timing falls within a set margin.

2. The imaging apparatus according to claim 1, wherein the control unit is configured to perform the margin-based flickerless control in a case where continuous imaging is performed while a live view image is being displayed.

3. The imaging apparatus according to claim 2, wherein, in a case where a capture exposure for generating both a single still image constituting continuously shot images and the live view image and one or multiple coma-to-coma exposures for generating the live view image are repeated during the continuous imaging,
the control unit is configured to perform the timing control for a first capture exposure after start of the continuous imaging, and,
for second and subsequent capture exposures, the control unit is configured not to perform the timing control as long as the offset amount of the specific timing falls within the margin but is configured to perform the timing control unless the offset amount of the specific timing falls within the margin.

4. The imaging apparatus according to claim 1, wherein a duration length from a start timing of a previous exposure duration to a start timing of a current exposure duration and a duration length from a start timing of an exposure duration before the previous exposure duration to the start timing of the previous exposure duration are the same,
and the control unit is configured to determine whether or not the offset amount of the specific timing in the current exposure duration from the peak timing falls within the margin.

5. The imaging apparatus according to claim 1, wherein the specific timing is a timing of an exposure centroid.

6. The imaging apparatus according to claim 1, wherein the margin is set in accordance with a curtain speed.

7. The imaging apparatus according to claim 1, wherein the margin is set according to an exposure shortfall from a peak level of the flicker component.

8. The imaging apparatus according to claim 1, wherein a different value is set as the margin according to whether or not flicker correction is to be performed on the basis of the period of the detected flicker component and the peak timing of the flicker component.

9. The imaging apparatus according to claim 1, wherein the margin is set according to the number of pixels read from an imaging element.

10. The imaging apparatus according to claim 1, wherein the margin is set according to whether or not exposure is for an image to record.

11. The imaging apparatus according to claim 10, wherein, in a case where the exposure is for the image to record, the margin is set narrower than that during a duration when the exposure for the image to record is not performed.

12. A non-transitory computer readable medium storing a program, the program being executable by at least one processor to perform operations comprising:
performing a margin-based flickerless control where a timing control is performed, on a basis of a period of a detected flicker component and a peak timing of the flicker component, to synchronize a specific timing within an exposure duration with the peak timing and where the timing control is not performed as long as an offset amount of the specific timing falls within a margin set as an offset allowance from the peak timing.

13. The non-transitory computer readable medium according to claim 12, wherein the operations further comprise:
performing the margin-based flickerless control in a case where continuous imaging is performed while a live view image is being displayed.

14. The non-transitory computer readable medium according to claim 13, wherein the operations further comprise:
in a case where a capture exposure for generating both a single still image constituting continuously shot images and the live view image and one or multiple coma-to-coma exposures for generating the live view image are repeated during the continuous imaging,
performing the timing control for a first capture exposure after start of the continuous imaging, and,
for second and subsequent capture exposures, not performing the timing control as long as the offset amount of the specific timing falls within the margin but is configured to perform the timing control unless the offset amount of the specific timing falls within the margin.

15. The non-transitory computer readable medium according to claim 12, wherein
a duration length from a start timing of a previous exposure duration to a start timing of a current exposure duration and a duration length from a start timing of an exposure duration before the previous exposure duration to the start timing of the previous exposure duration are the same,
and wherein the operations further comprise determining whether or not the offset amount of the specific timing in the current exposure duration from the peak timing falls within the margin.

16. The non-transitory computer readable medium according to claim 12, wherein the specific timing is a timing of an exposure centroid.

17. The non-transitory computer readable medium according to claim 12, wherein the margin is set in accordance with a curtain speed.

18. The non-transitory computer readable medium according to claim 12, wherein the margin is set according to an exposure shortfall from a peak level of the flicker component.

19. The non-transitory computer readable medium according to claim 12, wherein a different value is set as the margin according to whether or not flicker correction is to be performed on the basis of the period of the detected flicker component and the peak timing of the flicker component.

\* \* \* \* \*